United States Patent
Wolke et al.

(10) Patent No.: US 10,458,783 B2
(45) Date of Patent: Oct. 29, 2019

(54) THREE-DIMENSIONAL SCANNER HAVING PIXEL MEMORY

(71) Applicant: FARO Technologies, Inc., Lake Mary, FL (US)

(72) Inventors: Matthias Wolke, Korntal-Münchingen (DE); Rolf Heidemann, Stuttgart (DE); Gerrit Hillebrand, Waiblingen (DE); Daniel Döring, Ditzingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/152,789

(22) Filed: Oct. 5, 2018

(65) Prior Publication Data

US 2019/0113334 A1    Apr. 18, 2019

Related U.S. Application Data

(60) Provisional application No. 62/572,002, filed on Oct. 13, 2017.

(51) Int. Cl.
| | |
|---|---|
| *G01B 11/24* | (2006.01) |
| *G01B 11/25* | (2006.01) |
| *H04N 5/247* | (2006.01) |
| *G01S 17/89* | (2006.01) |

(52) U.S. Cl.
CPC .......... *G01B 11/25* (2013.01); *G01B 11/2545* (2013.01); *G01S 17/89* (2013.01); *H04N 5/247* (2013.01)

(58) Field of Classification Search
CPC . G01B 11/25; G01B 11/2513; G01B 11/2509; G01B 11/2527; G06T 7/0057

USPC .......................................................... 356/603
See application file for complete search history.

(56) References Cited

U.S. PATENT DOCUMENTS

| | | | |
|---|---|---|---|
| 6,711,293 B1 | 3/2004 | Lowe | |
| 7,352,446 B2 | 4/2008 | Bridges et al. | |
| 2015/0015898 A1 | 1/2015 | Atwell et al. | |
| 2015/0229907 A1* | 8/2015 | Bridges | G01B 21/047 |
| | | | 348/46 |
| 2017/0142393 A1 | 5/2017 | Oggier | |

FOREIGN PATENT DOCUMENTS

| | | |
|---|---|---|
| EP | 2519001 A2 | 10/2012 |
| WO | 2017162744 A1 | 9/2017 |

OTHER PUBLICATIONS

Extended European Search for Application No. 18199811.3 dated Feb. 19, 2019; (8 pgs).

* cited by examiner

*Primary Examiner* — Md M Rahman
(74) *Attorney, Agent, or Firm* — Cantor Colburn LLP

(57) ABSTRACT

A triangulation scanner includes a projector, a camera, and a processor, the projector projecting a first pattern of light on a first point during first intervals and a no light during second intervals, the camera including an optical detector, a first accumulator, and a second accumulator, the optical detector receiving reflected light from the first point, the first and second accumulators summing signals from the optical detector during the first and second intervals, respectively, the processor determining 3D coordinates of the first point based at least in part on the first pattern, the summed signals from the first and second accumulators, and a speed of light in air.

20 Claims, 28 Drawing Sheets

FRONT VIEW

REAR PERSPECTIVE VIEW

THREE-DIMENSIONAL SCANNER HAVING PIXEL MEMORY

CROSS REFERENCE TO RELATED APPLICATIONS

This application claims the benefit of U.S. Provisional Application Ser. No. 62/572,002, filed Oct. 13, 2017, the entire disclosure of which is incorporated herein by reference.

FIELD OF THE INVENTION

The subject matter disclosed herein relates in general to a three-dimensional (3D) measuring device that uses reflected light to measure 3D coordinates of objects.

BACKGROUND

One type of 3D measuring device is a triangulation scanner that uses a triangulation method to measure the 3D coordinates of points on an object. The triangulation scanner usually includes a projector that projects onto a surface of the object either a pattern of light in a line or a pattern of light covering an area. A camera is coupled to the projector in a fixed relationship, for example, by attaching a camera and the projector to a common frame. The light emitted from the projector is reflected off the object surface and is detected by the camera. Since the camera and projector are arranged in a fixed relationship, the distance to the object may be determined using trigonometric principles. Compared to coordinate measurement devices that use tactile probes, triangulation systems provide advantages in quickly acquiring coordinate data over a large area. As used herein, the resulting collection of 3D coordinate values or data points of the object being measured by the triangulation system is referred to as point cloud data or simply a point cloud.

A situation commonly encountered by triangulation scanners used outdoors is saturation of camera arrays by bright sunlight. Another difficulty encountered by triangulation scanners the ability to acquire dense detail from 2D camera images while still retaining relatively high 3D accuracy using triangulation methods. Another difficulty of triangulation scanners is obtaining high-dynamic-range 3D images and colored 3D images based on two-dimensional (2D) color images having high dynamic range. Another difficulty of triangulation scanners is removing ambiguities in determining 3D coordinates A further difficulty is in determining color reflectance characteristics of objects being measured in three dimensions.

Accordingly, while existing 3D triangulation scanners are suitable for their intended purpose, the need for improvement remains, particularly in providing a 3D triangulation scanner with the features described here.

BRIEF DESCRIPTION

According to a further embodiment of the present invention, a triangulation scanner system comprises: a projector operable to project onto an object a first pattern of light at a first light level during first time intervals and to project onto the object the first pattern of light at a second light level during second time intervals, the second light level being different than the first light level; a first camera including a first lens and a first integrated circuit having a first photosensitive array, the first photosensitive array having a plurality of pixels including a first pixel, the first pixel including an optical detector, a first memory, and a second memory, the optical detector operable to produce signals in response to light levels reflected from a first point on the object, the first memory operable to store signals received from the optical detector during the first time intervals to obtain a first stored signal, the second memory operable to store signals received from the optical detector during the second time intervals to obtain a second stored signal; and a processor operable to execute computer instructions that, when executed on the processor, determine three-dimensional (3D) coordinates of the first point based at least in part on the projected first pattern of light, the first stored signal, and the second stored signal.

In addition to one or more of the features described herein, or as an alternative, further embodiments of the system may include the processor being further operable to execute computer instructions that, when executed on the processor, determine the 3D coordinates of the first point further based on a relative pose of the projector and the first camera. In addition to one or more of the features described herein, or as an alternative, further embodiments of the system may include the first time interval having a corresponding second time interval of equal duration. In addition to one or more of the features described herein, or as an alternative, further embodiments of the system may include an analog-to-digital converter operable to convert analog signals to digital signals, the analog-to-digital converter being at a location selected from the group consisting of: within the first pixel, outside the first pixel but within the first integrated circuit, and outside the first integrated circuit.

In addition to one or more of the features described herein, or as an alternative, further embodiments of the system may include a second camera including a second lens and a second integrated circuit having a second photosensitive array, the second camera operable to capture a second image of the object on the second photosensitive array. In addition to one or more of the features described herein, or as an alternative, further embodiments of the system may include the processor being further operable to execute computer instructions that, when executed on the processor, determine the 3D coordinates of the first point further based on a relative pose of the first camera and the second camera.

According to a further embodiment of the present invention, a method comprises: providing a projector, a first camera, and a processor, the first camera including a first lens and a first integrated circuit having a first photosensitive array, the first photosensitive array having a plurality of pixels including a first pixel, the first pixel including an optical detector, a first memory, and a second memory; with the projector, projecting onto an object a first pattern of light at a first light level during a first time interval; with the projector, projecting onto the object the first pattern of light at a second light level during a second time interval, the second light level being different than the first light level; with the optical detector, producing signals in response to light levels reflected from a first point on the object; with the first memory, storing a signal received from the optical detector during the first time interval to obtain a first stored signal; with the second memory, storing a signal received from the optical detector during the second time interval to obtain a second stored signal; with the processor, executing computer instructions to determine three-dimensional (3D) coordinates of the first point based at least in part on the projected first pattern of light, the first stored signal, and the second stored signal; and storing the 3D coordinates of the first point.

In addition to one or more of the features described herein, or as an alternative, further embodiments of the method may include executing with the processor computer instructions to determine the 3D coordinates of the first point further based on a relative pose of the projector and the first camera. In addition to one or more of the features described herein, or as an alternative, further embodiments of the method may include the first time interval having a corresponding second time interval of equal duration. In addition to one or more of the features described herein, or as an alternative, further embodiments of the method may include providing an analog-to-digital converter, the analog-to-digital converter being at a location selected from the group consisting of: within the first pixel, outside the first pixel but within the first integrated circuit, and outside the first integrated circuit. In addition to one or more of the features described herein, or as an alternative, further embodiments of the method may include converting with the analog-to-digital converter, analog signals to digital signals.

In addition to one or more of the features described herein, or as an alternative, further embodiments of the method may include providing a second camera including a second lens and a second integrated circuit having a second photosensitive array; and with the second camera, capturing a second image of the object on the second photosensitive array. In addition to one or more of the features described herein, or as an alternative, further embodiments of the method may include executing computer instructions, with the processor, to determine the 3D coordinates of the first point further based on a relative pose of the first camera and the second camera.

According to a further embodiment of the present invention, a triangulation scanner system comprises: a projector operable to project onto an object a first pattern of light; a first camera including a first lens and a first integrated circuit having a first photosensitive array, the first photosensitive array having a plurality of pixels including a first pixel, the first pixel including an optical detector, a first memory, and a second memory, the optical detector operable to produce signals in response to light levels reflected from a first point on the object, the first memory operable to store a signal received from the optical detector during a first time interval to obtain a first stored signal, the second memory operable to store a signal received from the optical detector during a second time interval to obtain a second stored signal, the second time interval being different than the first time interval; and a processor operable to execute computer instructions that, when executed on the processor, determine three-dimensional (3D) coordinates of the first point based at least in part on the projected first pattern of light, the first stored signal, and the second stored signal.

In addition to one or more of the features described herein, or as an alternative, further embodiments of the system may include the processor being further operable to execute computer instructions that, when executed on the processor, determine the 3D coordinates of the first point further based on a relative pose of the projector and the first camera. In addition to one or more of the features described herein, or as an alternative, further embodiments of the system may include the first time interval having a corresponding second time interval of equal duration. In addition to one or more of the features described herein, or as an alternative, further embodiments of the system may include an analog-to-digital converter operable to convert analog signals to digital signals, the analog-to-digital converter being at a location selected from the group consisting of: within the first pixel, outside the first pixel but within the first integrated circuit, and outside the first integrated circuit.

According to a further embodiment of the present invention, a method comprises: providing a projector, a first camera, and a processor, the first camera including a first lens and a first integrated circuit having a first photosensitive array, the first photosensitive array having a plurality of pixels including a first pixel, the first pixel including an optical detector, a first memory, and a second memory; with the projector, projecting onto an object a first pattern of light; with the optical detector, producing signals in response to light levels reflected from a first point on the object; with the first memory, storing a signal received from the optical detector during the first time interval to obtain a first stored signal; with the second memory, storing a signal received from the optical detector during the second time interval to obtain a second stored signal, the second time interval being different than the first time interval; with the processor, executing computer instructions to determine three-dimensional (3D) coordinates of the first point based at least in part on the projected first pattern of light and on the first stored signal and the second stored signal; and storing the 3D coordinates of the first point.

In addition to one or more of the features described herein, or as an alternative, further embodiments of the method may include executing computer instructions, with the processor, to determine the 3D coordinates of the first point further based on a relative pose of the projector and the first camera. In addition to one or more of the features described herein, or as an alternative, further embodiments of the method may include providing a second camera including a second lens and a second integrated circuit having a second photosensitive array; and with the second camera, capturing a second image of the object on the second photosensitive array. In addition to one or more of the features described herein, or as an alternative, further embodiments of the method may include executing computer instructions, with the processor, to determine the 3D coordinates of the first point further based on a relative pose of the first camera and the second camera.

According to a further embodiment of the present invention, a triangulation scanner system comprises: a projector operable to alternately project onto an object a first pattern of light during first time intervals and no light during second time intervals; a first camera including a first lens and a first integrated circuit having a first photosensitive array, the first camera operable to capture a first image of the object on the first photosensitive array, the first photosensitive array having a plurality of pixels including a first pixel, the first pixel including an optical detector, a first accumulator, and a second accumulator, the optical detector operable to produce signals in response to a light levels reflected from a first point on the object, the first accumulator operable to sum the signals received by optical detector during the first time intervals to obtain a first summed signal, the second accumulator operable to sum the signals received during the second time intervals obtain a second summed signal; and a processor operable to execute computer instructions that, when executed on the processor, determine three-dimensional (3D) coordinates of the first point based at least in part on the projected first pattern of light and on the first summed signal and a the second summed signal.

In addition to one or more of the features described herein, or as an alternative, further embodiments of the system may include the processor being further operable to execute computer instructions that, when executed on the processor, determine the 3D coordinates of the first point further based on a relative pose of the projector and the first camera. In addition to one or more of the features described herein, or as an alternative, further embodiments of the system may include the processor being operable to execute computer instructions that, when executed on the processor, determine the 3D coordinates of the first point further based a sum of the first time intervals and on a sum of the second time intervals. In addition to one or more of the features described herein, or as an alternative, further embodiments of the system may include the processor being further operable to execute computer instructions that, when executed on the processor, determine the 3D coordinates of the first point based further based on taking a difference in a first scaled summed signal and a second scaled summed signal, the first scaled summed signal being obtained by scaling the first summed signal in inverse proportion to the sum of the first time intervals, the second scaled summed signal being obtained by scaling the second summed signal in inverse proportion to the sum of the second time intervals.

In addition to one or more of the features described herein, or as an alternative, further embodiments of the system may include each first time interval has a corresponding second time interval of equal duration, the processor being further operable to execute computer instructions that, when executed on the processor, determine the 3D coordinates of the first point further based on a difference in the first summed signal and the second summed signal. In addition to one or more of the features described herein, or as an alternative, further embodiments of the system may include the first accumulator is operable to obtain the first summed signal by summing an integer N of signals received from the optical detector during the first time intervals; and the second accumulator is operable to obtain the second summed signal by summing the integer N of signals received from the optical detector during the second time intervals, the integer N being a number greater than one.

In addition to one or more of the features described herein, or as an alternative, further embodiments of the system may include the first accumulator is operable to obtain the first summed signal by summing a first integer number of signals received from the optical detector during the first time intervals; and the second accumulator is operable to obtain the second summed signal by summing a second integer number of signals received from the optical detector during the second time intervals, the first integer number differing from the second integer number by one.

In addition to one or more of the features described herein, or as an alternative, further embodiments of the system may include a processor being further operable to execute computer instructions that, when executed on the processor, determine three-dimensional (3D) coordinates of the first point further based at least in part on the projected first pattern of light and on a difference in the first summed signal and the second summed signal. In addition to one or more of the features described herein, or as an alternative, further embodiments of the system may include wherein the difference in the first summed signal and the second summed signal is determined by an electrical component selected from the group consisting of: an electrical component within the first pixel, an electrical component outside the first pixel but within the first integrated circuit, and an electrical component outside the first integrated circuit.

In addition to one or more of the features described herein, or as an alternative, further embodiments of the system may include the difference in the first summed signal and the second summed signal is determined by an analog electrical component within the first pixel. In addition to one or more of the features described herein, or as an alternative, further embodiments of the system may include an analog-to-digital converter operable to convert analog signals to digital signals, the analog-to-digital converter being at a location selected from the group consisting of: within the first pixel, outside the first pixel but within the first integrated circuit, and outside the first integrated circuit.

In addition to one or more of the features described herein, or as an alternative, further embodiments of the system may include a second camera including a second lens and a second integrated circuit having a second photosensitive array, the second camera operable to capture a second image of the object on the second photosensitive array. In addition to one or more of the features described herein, or as an alternative, further embodiments of the system may include the processor being operable to execute computer instructions that, when executed on the processor, determine the 3D coordinates of the first point further based on a relative pose of the first camera and the second camera. In addition to one or more of the features described herein, or as an alternative, further embodiments of the system may include the processor being further operable to execute computer instructions that, when executed on the processor, uses the first image captured in one of the first time intervals or one of the second time intervals to provide at least one of the functions selected from the group consisting of: tracking, photogrammetry, colorization, and grayscale overlay.

According to a further embodiment of the present invention, a method comprises: providing a projector, a first camera, and a processor, the first camera including a first lens and a first integrated circuit having a first photosensitive array, the first photosensitive array having a plurality of pixels including a first pixel, the first pixel including an optical detector, a first accumulator, and a second accumulator; alternately projecting onto an object a first pattern of light during first time intervals and no light during second time intervals; with the optical detector, producing signals in response to a light levels reflected from a first point on the object, with the first accumulator, summing signals received from the optical detector during the first time intervals to obtain a first summed signal; with the second accumulator, summing signals received during the second time intervals to obtain a second summed signal; determining with the processor three-dimensional (3D) coordinates of the first point based at least in part on the projected first pattern of light and on the first summed signal and the second summed signal; and storing the 3D coordinates of the first point.

In addition to one or more of the features described herein, or as an alternative, further embodiments of the method may include determining with the processor the 3D coordinates of the first point further based on a relative pose of the projector and the first camera. In addition to one or more of the features described herein, or as an alternative, further embodiments of the method may include determining the 3D coordinates of the first point further based a sum of the first time intervals and on a sum of the second time intervals. In addition to one or more of the features described herein, or as an alternative, further embodiments of the method may include determining by the processor the 3D coordinates of the first point based at least in part on a difference in a first scaled summed signal and a second scaled summed signal, the first scaled summed signal being obtained by scaling the first summed signal in inverse proportion to the sum of the first time intervals, the second scale summed signal being obtained by scaling the second summed signal in inverse proportion to the sum of the second time intervals.

In addition to one or more of the features described herein, or as an alternative, further embodiments of the method may include each first time interval having a corresponding second time interval of equal duration, the processor determining the 3D coordinates of the first point further based on a difference in the first summed signal and the second summed signal. In addition to one or more of the features described herein, or as an alternative, further embodiments of the method may include obtaining with the first accumulator the first summed signal by summing an integer N of signals received from the optical detector during the first time intervals, the integer N being a number greater than one; and with the second accumulator, obtaining the second summed signal by summing the integer N of signals received from the optical detector during the second time intervals.

In addition to one or more of the features described herein, or as an alternative, further embodiments of the method may include the difference in the first summed signal and the second summed signal is determined by an electrical component selected from the group consisting of: an electrical component within the first pixel, an electrical component outside the first pixel but within the first integrated circuit, and an electrical component outside the first integrated circuit. In addition to one or more of the features described herein, or as an alternative, further embodiments of the method may include determining by an analog electrical component within the first pixel the difference in the first summed signal and the second summed signal.

In addition to one or more of the features described herein, or as an alternative, further embodiments of the method may include providing an analog-to-digital converter to convert analog signals to digital signals, the analog-to-digital converter being at a location selected from the group consisting of: within the first pixel, outside the first pixel but within the first integrated circuit, and outside the first integrated circuit. In addition to one or more of the features described herein, or as an alternative, further embodiments of the method may include providing a second camera having a second lens and a second integrated circuit having a second photosensitive array, the second camera operable to capture a second image of the object on the second photosensitive array. In addition to one or more of the features described herein, or as an alternative, further embodiments of the method may include determining with the processor the 3D coordinates of the first point on the object further based on a relative pose of the first camera and the second camera. In addition to one or more of the features described herein, or as an alternative, further embodiments of the method may include performing by the processor a function selected from the group consisting of tracking, photogrammetry, colorization, and grayscale overlay, the performing based at least in part on the first image captured in one of the first time intervals or in one of the second time intervals.

According to a further embodiment of the present invention, a three-dimensional (3D) measuring system comprises: a first camera including a first lens and a first integrated circuit having a first photosensitive array, the first photosensitive array having a first plurality of pixels including a first pixel, the first pixel including a first optical detector, a first memory, and a second memory, the first optical detector operable to produce signals in response to light levels reflected onto the first optical detector from a first point on the object, the first memory operable to store a first signal received from the first optical detector during first time intervals to obtain a first stored signal, the second memory operable to store a second signal received from the first optical detector during second time intervals to obtain a second stored signal; a second camera including a second lens and a second integrated circuit having a second photosensitive array, the second photosensitive array having a second plurality of pixels including a second pixel, the second pixel including a second optical detector, a third memory, and a fourth memory, the second optical detector operable to produce signals in response to light levels reflected onto the second optical detector from the first point on the object, the third memory operable to store signals received from the optical detector during the first time intervals to obtain a third stored signal, the second memory operable to store signals received from the optical detector during the second time intervals to obtain a fourth stored signal; and a processor operable to execute computer instructions that, when executed on the processor, determines three-dimensional (3D) coordinates of the first point based at least in part on the first stored signal, the second stored signal, the third stored signal, and the fourth stored signal.

In addition to one or more of the features described herein, or as an alternative, further embodiments of the system may include the processor being further operable to execute computer instructions that, when executed on the processor, determine the 3D coordinates of the first point further based on a relative pose of the first camera and the second camera. In addition to one or more of the features described herein, or as an alternative, further embodiments of the system may include the processor being further operable to execute computer instructions that, when executed on the processor, determine the 3D coordinates of the first point further based on a correspondence between the first pixel and the second pixel, the determined correspondence based at least in part on a comparison of a first image captured by the first camera and a second image of the second camera. In addition to one or more of the features described herein, or as an alternative, further embodiments of the system may include the first camera further comprising an analog-to-digital converter operable to convert analog signals to digital signals, the analog-to-digital converter being at a location selected from the group consisting of: within the first pixel, outside the first pixel but within the first integrated circuit, and outside the first integrated circuit.

According to a further embodiment of the present invention, a method comprises: providing a first camera including a first lens and a first integrated circuit having a first photosensitive array, the first photosensitive array having a first plurality of pixels including a first pixel, the first pixel including a first optical detector, a first memory, and a second memory; providing a second camera including a second lens and a second integrated circuit having a second photosensitive array, the second photosensitive array having a second plurality of pixels including a second pixel, the second pixel including a second optical detector, a third memory, and a fourth memory; with the first optical detector, producing signals in response to light levels reflected onto the first optical detector from a first point on the object; with the second optical detector, producing signals in response to light levels reflected onto the second optical detector from the first point on the object; with the first memory, storing a first signal received from the first optical detector during a first time interval to obtain a first stored signal; with the second memory, storing a second signal received from the first optical detector during a second time interval to obtain a second stored signal; with the third memory, storing a third signal received from the second optical detector during the first time interval to obtain a third stored signal; with the fourth memory, storing a fourth signal received from the second optical detector during the second time interval to obtain a fourth stored signal; with a processor, executing computer instructions that determine three-dimensional (3D) coordinates of the first point based at least in part on the first stored signal, the second stored signal, the third stored signal, and the fourth stored signal; and storing the 3D coordinates of the first point.

In addition to one or more of the features described herein, or as an alternative, further embodiments of the method may include executing computer instructions, with the processor, that determine 3D coordinates of the first point further based on a relative pose of the first camera and the second camera. In addition to one or more of the features described herein, or as an alternative, further embodiments of the method may include executing computer instructions, with the processor, that determine the 3D coordinates of the first point further based on a correspondence between the first pixel and the second pixel, the determined correspondence based at least in part on a comparison of a first image captured by the first camera and a second image of the second camera.

In addition to one or more of the features described herein, or as an alternative, further embodiments of the method may include providing an analog-to-digital converter, the analog-to-digital converter being at a location selected from the group consisting of: within the first pixel, outside the first pixel but within the first integrated circuit, and outside the first integrated circuit; and with the analog-to-digital converter, converting analog signals to digital signals.

According to a further embodiment of the present invention, a three-dimensional (3D) measuring system comprises: a first projector operable to project onto an object a pattern of light, the first projector further operable to temporally modulate light to produce a temporal waveform; a first camera including a lens and an integrated circuit having a photosensitive array, the first camera operable to capture a first image of the object on the photosensitive array, the photosensitive array having a plurality of pixels including a first pixel, the first pixel including a first optical detector that produces first signals in response to light reflected from a first point on the object; and a processor operable to execute computer instructions that, when executed on the processor, determine 3D coordinates of the first point based at least in part on the temporal waveform, the speed of light in air, and the projected pattern of light.

In addition to one or more of the features described herein, or as an alternative, further embodiments of the system may include the processor being further operable to execute computer instructions that, when executed on the processor, determine the 3D coordinates of the first point further based on a relative pose of the first projector and the first camera. In addition to one or more of the features described herein, or as an alternative, further embodiments of the system may include the first projector is operable to modulate the pattern of light with the temporal waveform; and the processor is further operable to execute computer instructions that, when executed on the processor, determine the 3D coordinates of the first point further based on the pattern of light modulated with the temporal waveform.

In addition to one or more of the features described herein, or as an alternative, further embodiments of the system may include the first projector being operable to project the pattern of light and the temporal waveform at different times. In addition to one or more of the features described herein, or as an alternative, further embodiments of the system may include the temporal modulation is square-wave modulation. In addition to one or more of the features described herein, or as an alternative, further embodiments of the system may include the temporal modulation is sinusoidal modulation. In addition to one or more of the features described herein, or as an alternative, further embodiments of the system may include the processor being further operable to execute computer instructions that, when executed on the processor, determine 3D coordinates of the first point based at least in part on a calculated phase shift of the sinusoidal modulation, the calculated phase shift being determined based at least in part on accumulating of the first signals in the first pixel.

In addition to one or more of the features described herein, or as an alternative, further embodiments of the system may include the processor being further operable to execute computer instructions that, when executed on the processor, determine an amplitude of the sinusoidally modulated light reflected off the first point and arriving at the first optical detector. In addition to one or more of the features described herein, or as an alternative, further embodiments of the system may include the processor being further operable to execute computer instructions that, when executed on the processor, determine an offset of the sinusoidally modulated light received by the first optical detector. In addition to one or more of the features described herein, or as an alternative, further embodiments of the system may include the temporal modulation being pulsed modulation.

In addition to one or more of the features described herein, or as an alternative, further embodiments of the system may include the first optical detector being responsive to light levels reflected from a first point on the object during one or more time-gate intervals. In addition to one or more of the features described herein, or as an alternative, further embodiments of the system may include the first pixel further includes a first accumulator and a second accumulator, the first accumulator operable to sum the signals received by optical detector during first time intervals to obtain a first summed signal, the second accumulator operable to sum the signals received during second time intervals obtain a second summed signal; and the processor is further operable to execute computer instructions that, when executed on the processor, determine three-dimensional (3D) coordinates of the first point further based on a difference in the first summed signal and the second summed signal.

In addition to one or more of the features described herein, or as an alternative, further embodiments of the system may include a second camera. In addition to one or more of the features described herein, or as an alternative, further embodiments of the system may include a second projector. In addition to one or more of the features described herein, or as an alternative, further embodiments of the system may include the second projector, if temporally modulated, being modulated at a different rate than the first projector. In addition to one or more of the features described herein, or as an alternative, further embodiments of the system may include the second projector being selected from the group consisting of: an integrated projector rigidly affixed to the first projector and the first camera and an external projector not rigidly affixed to the first projector and the first camera According to a further embodiment of the present invention, a method comprises: providing a projector, a camera, and a processor, the camera including a first lens and an integrated circuit having a photosensitive array, the photosensitive array having a plurality of pixels including a first pixel, the first pixel including an optical detector responsive to light levels reflected from a first point on the object; with the projector, projecting onto an object a pattern of light; with the projector, projecting onto the object a temporal waveform; with the camera, capturing the pattern of light and the temporal waveform; with the processor, determining three-dimensional (3D) coordinates of the first point based at least in part on the temporal waveform, the speed of light in air, and the projected pattern of light; and storing the 3D coordinates of the first point.

In addition to one or more of the features described herein, or as an alternative, further embodiments of the method may include the temporal waveform being superimposed on the pattern of light. In addition to one or more of the features described herein, or as an alternative, further embodiments of the method may include the temporal waveform being projected at a first time and the pattern of light is projected at a second time different than the first time. In addition to one or more of the features described herein, or as an alternative, further embodiments of the method may include determining the 3D coordinates of the first point further based on a relative pose of the first projector and the first camera.

According to a further embodiment of the present invention, a multispectral imaging system comprises: a projector operable to repetitively project a sequence of N wavelengths onto an object; a camera including an integrated circuit having a photosensitive array, the photosensitive array having a plurality of pixels including a first pixel, the first pixel including an optical detector and a plurality M of memories, each of the M memories operable to sequentially receive and accumulate signals from the optical detector for one of the N wavelengths; and a processor operable to execute computer instructions that, when executed on the processor, determine three-dimensional (3D) coordinates of the first point based at least in part on the projected first pattern of light, the first stored signal, and the second stored signal.

In addition to one or more of the features described herein, or as an alternative, further embodiments of the system may include the plurality M of memories being one greater than the number N of wavelengths. In addition to one or more of the features described herein, or as an alternative, further embodiments of the system may include the plurality M of memories being equal to the number N of wavelengths.

According to a further embodiment of the present invention, a multispectral imaging system comprises: a projector operable to repetitively project a sequence of N wavelengths onto an object; a camera including an integrated circuit having a photosensitive array, the photosensitive array having a plurality of pixels including a first pixel, the first pixel including an optical detector and a plurality M of memories, each of the M memories operable to sequentially receive and accumulate signals from the optical detector for one of the N wavelengths; and a processor operable to execute computer instructions that, when executed on the processor, determine three-dimensional (3D) coordinates of the first point based at least in part on the projected first pattern of light, the first stored signal, and the second stored signal.

In addition to one or more of the features described herein, or as an alternative, further embodiments of the method may include the plurality M of memories being one greater than the number N of wavelengths. In addition to one or more of the features described herein, or as an alternative, further embodiments of the method may include the plurality M of memories being equal to the number N of wavelengths.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments of the present invention provide advantages to triangulation scanners by avoiding saturation of camera arrays by bright background light such as sunlight. Further embodiments provide advantages in capturing high object detail based on 2D camera images while retaining relatively high 3D accuracy using triangulation scan data. Further embodiments provide advantages in obtaining high-dynamic-range 3D images and colored 3D images based on 2D color images having high dynamic range. Further embodiments provide advantages to triangulation scanners by removing ambiguities in determining 3D coordinates. Further embodiments provide multi-spectral capability for determining color reflectance characteristics of objects being measured in three dimensions.

Figure 1:
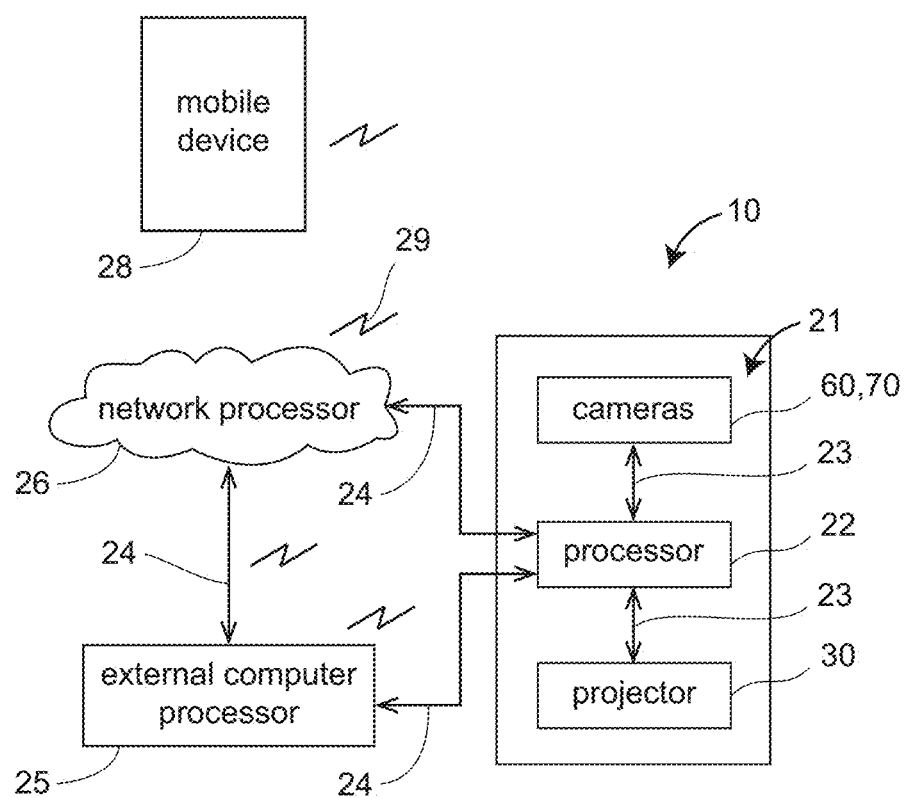
FIG. 1 is a block diagram showing elements of a 3D measuring system according to an embodiment of the present invention.

In an embodiment illustrated in FIG. 1, the 3D imager 10 includes an internal electrical system 21 having a processor 22 that communicates with electrical components of projector 30 and cameras 60, 70 by electrical lines 23. The processor 22 may include a plurality of processor elements such as microprocessors, digital signal processors (DSPs), field-programmable gate arrays (FPGAs), memory components, or any other type of device capable of performing computing or storage functions. The processor 22 may communicate with an external computer processor 25 or a network processor 26 over a communications medium such as wired channels 24 or wireless channels 29. The external computer processor 25 may bidirectionally communicate with the network processor 26 over wired channels 24 or wireless channels 29. In an embodiment, one or more of the processor 22, the external computer 25, and the network processor 26 communicate over a wireless channel 29 with a mobile device 28 such as a smart mobile phone or a computer tablet.

In an embodiment illustrated in FIG. 1, the 3D imager 10 includes an internal electrical system 21 that includes a processor 22 that communicates with electrical components. In an embodiment, the processor 22 communicates with electrical components of projector 30 and cameras 60, 70 by electrical lines 23. The processor 22 may include a plurality of processor elements such as microprocessors, digital signal processors (DSPs), field-programmable gate arrays (FPGAs), memory components, or any other type of device capable of performing computing or storage functions. The processor 22 may communicate with an external computer processor 25 or a network processor 26 over a communications medium such as wired channels 24 or wireless channels 29. The external computer processor 25 may bidirectionally communicate with the network processor 26 over wired channels 24 or wireless channels 29. In an embodiment, one or more of the processor 22, the external computer 25, and the network processor 26 communicate over a wireless channel 29 with a mobile device 28 such as a smart mobile phone or a computer tablet.

Communication among the computing (processing and memory) components may be wired or wireless. Examples of wireless communication methods include IEEE 802.11 (Wi-Fi), IEEE 802.15.1 (Bluetooth), and cellular communication (e.g., 3G, 4G, and 5G). Many other types of wireless communication are possible. A popular type of wired communication is IEEE 802.3 (Ethernet). In some cases, multiple external processors, such as network processors 26 may be connected in a distributed computing configuration, such as cloud based computing. These network processors 26 may be used to process scanned data in parallel, thereby providing faster results, such as in embodiments where relatively time-consuming registration and filtering may occur.

In an embodiment, the projector 30 includes a light source such as a light emitting diode (LED) that projects light onto a digital micromirror device (DMD). In an embodiment, the processor 22 sends the projector 30 relatively high speed electrical pattern sequences that result in the projection of the indicated patterns of light. In other embodiments, other types of image-generating devices are used in the projector. Examples include transparency slides, liquid crystal on silicon (LCoS) arrays, and holographic optical elements (HOEs), also known as diffractive optical elements (DOEs).

Figure 2:
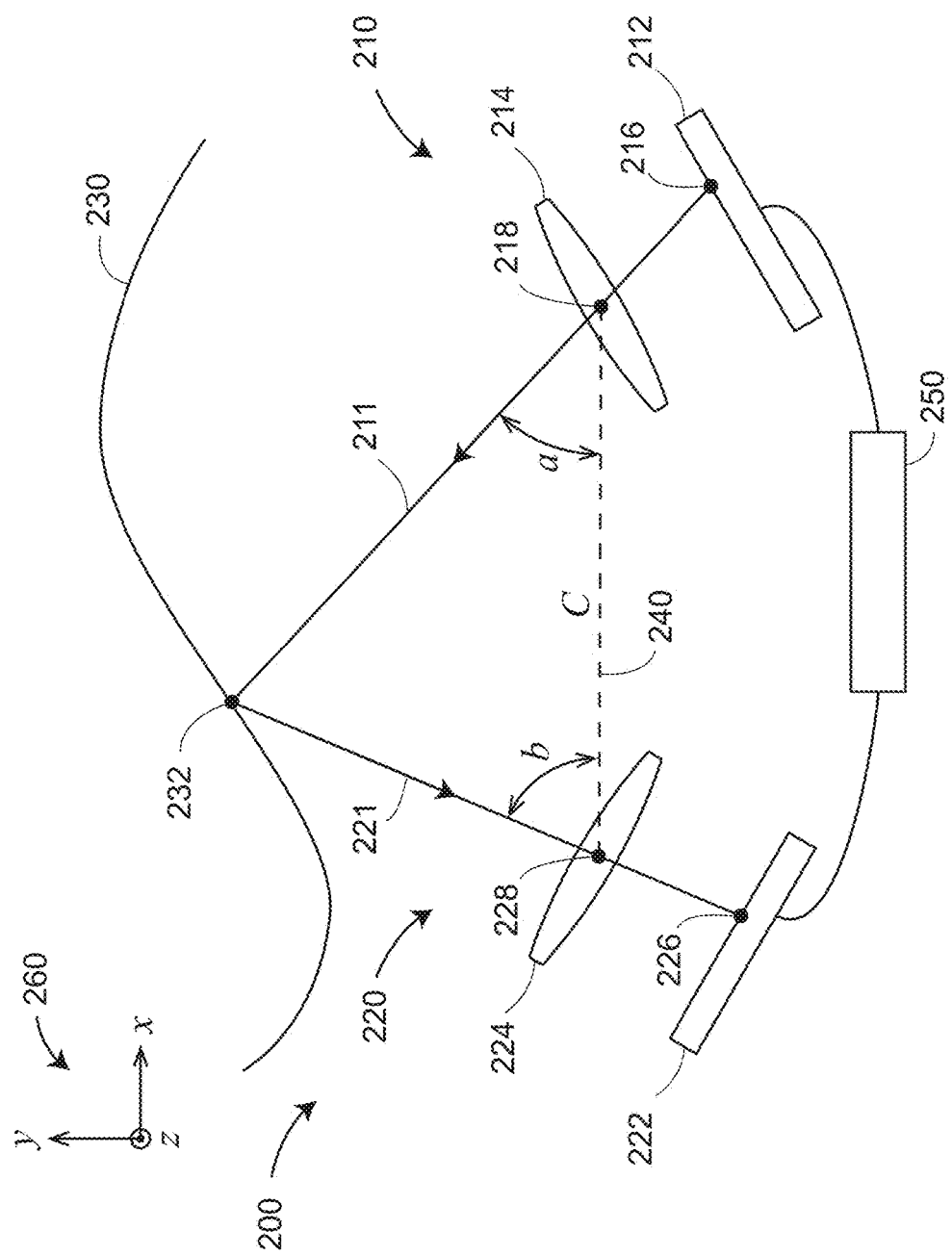
FIG. 2 is a schematic illustration of the principle of operation of a triangulation scanner having a camera and a projector according to an embodiment of the present invention.

FIG. 2 shows a structured light triangulation scanner 200 that projects a pattern of light over an area on a surface 230. The scanner 200, which has a frame of reference 260, includes a projector 210 and a camera 220. In an embodiment, the projector 210 includes an illuminated projector pattern generator 212, a projector lens 214, and a perspective center 218 through which a ray of light 211 emerges or is emitted. The ray of light 211 emerges from a corrected point 216 having a corrected position on the pattern generator 212. In an embodiment, the point 216 has been corrected to account for aberrations of the projector 210, including aberrations of the lens 214, in order to cause the ray to pass through the perspective center, thereby simplifying triangulation calculations.

The ray of light 211 intersects the surface 230 in a point 232, which is reflected (scattered) off the surface 230 and sent through the camera 220 that includes a camera lens 224 and a photosensitive array 222. The reflected light passes through the camera lens 224 to create an image of the pattern on the surface 230 of the photosensitive array 222. The light from the point 232 passes in a ray 221 through the camera perspective center 228 to form an image spot at the corrected point 226. The image spot is corrected in position to correct for aberrations in the camera lens 224. A correspondence is obtained between the point 226 on the photosensitive array 222 and the point 216 on the illuminated projector pattern generator 212. As explained herein below, the correspondence may be obtained by using a coded or an uncoded (sequentially projected) pattern. Once the correspondence is known, the angles a and b in FIG. 2 may be determined. The baseline 240, which is a line segment drawn between the perspective centers 218, 228, has a length C. Knowing the angles a, b and the length C, all the angles and side lengths of the triangle formed by lines connecting the perspective centers 228, 218 and the point 232 may be determined. Digital image information is transmitted to a processor 250, which determines 3D coordinates of the surface 230. The processor 250 may also instruct the illuminated pattern generator 212 to generate an appropriate pattern. The processor 250 may be located within the scanner assembly, or it may be an external computer, or a remote server. The processor 250 may also include a plurality of distinct computing, processing, and storage elements.

As used herein, the term "pose" refers to a combination of a position and an orientation. In an embodiment, knowledge of the position and the orientation are desired for the camera and the projector in a frame of reference of the 3D imager 200. Since a position is characterized by three translational degrees of freedom (such as x, y, z) and an orientation is composed of three orientational degrees of freedom (such as roll, pitch, and yaw angles), the term pose defines a total of six degrees of freedom. In a triangulation calculation, a relative pose of the camera and the projector are desired within the frame of reference of the 3D imager. As used herein, the term "relative pose" is used because the perspective center of the camera or the projector or any other point tied to the scanner 200 can be located on an (arbitrary) origin of the 3D imager system. In most cases, a relative pose described by six degrees of freedom is sufficient to perform the triangulation calculation. For example, the origin of a 3D imager can be placed at the perspective center of the camera. The baseline C (between the camera perspective center and the projector perspective center) may be selected to coincide with the x axis of the 3D imager. The y axis may be selected perpendicular to the baseline and the optical axis of the camera. Two additional angles of rotation are used to fully define the orientation of the camera system. Three additional angles of rotation are used to fully define the orientation of the projector. In this embodiment, six degrees-of-freedom define the state of the 3D imager: one baseline, two camera angles, and three projector angles. In other embodiments, other coordinate representations are possible.

Figure 3:
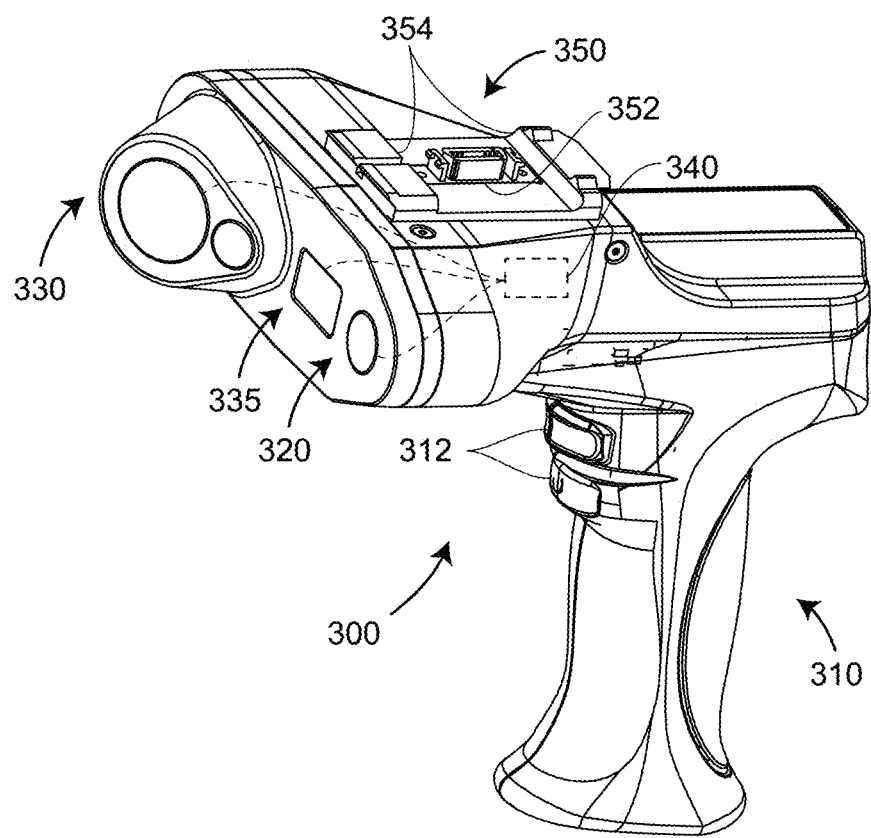
FIG. 3 is a perspective view of a handheld triangulation scanner having a camera and a projector according to an embodiment of the present invention.

FIG. 3 is a perspective view of a handheld triangulation scanner 300 having a pistol grip 310 with one or more actuators 312. In an embodiment, the scanner 300 includes a projector 320 and a camera 330. In an embodiment, the projector projects onto an object a two-dimensional pattern of light and the camera 330 captures the two-dimensional pattern of light. In an embodiment, a processor 340 determines a one-to-one correspondence among elements of the projected pattern and captured image. In an embodiment, it further determines 3D coordinates of the object based at least in part on projected pattern, the captured image, and the relative geometry of the projector 320 and the camera 330. In another embodiment, the projector projects a laser line rather than a pattern distributed over an area. In this case, the position of the points of light captured on a 2D array provides the information needed by the processor 340 to determine the correspondence between projected and imaged points and to determine the 3D coordinates of points on the object. In another embodiment, the projector 320 projects an uncoded pattern of light rather than a coded pattern of light onto the object. An example of such an uncoded pattern of light is a collection of identical dots arranged in a grid. Such a pattern may be generated, for example, by sending laser light through a diffractive optical element (DOE). In this case, the projected spots may be spaced sparsely enough to enable direct determination of correspondence between projected and imaged spots.

Successive 2D images captured by the camera 330 may be registered into a frame of reference of the object in a number of different ways. In an embodiment, the processor 340, which may be an external processor 340, applies photogrammetry methods to multiple 2D images captured by a second camera 335 to register determined 3D object coordinates. In other embodiments, a registration device is attached to an interface 350 of the scanner 300. In an embodiment, the interface 350 provides electrical and mechanical interface functions through elements 352, 354, respectively. The interface 350 may be used to attach the handheld triangulation scanner 300 to many types of registration devices. Examples of registration devices include a six-DOF laser-tracker accessory, a camera accessory, and a light-point accessory. A six-DOF laser tracker accessory includes at least one retroreflector and may include any of many types of additional elements to enable determining of the six degrees-of-freedom of the scanner 300. Such additional elements may include, for example, points of light on the probe, lines on the retroreflector, optical position detectors, or polarizers used with optical detectors. In an embodiment, the camera accessory includes a single camera. In another embodiment, the camera accessory is a stereo camera having two cameras. In embodiments, the camera attachment determines registration based on successive imaging of artificial markers placed on or near the object, natural features of the object, or externally projected spots on the object. In an embodiment, a light point accessory includes a points of light or patterns of light on a structure that attaches to the interface 350. In an embodiment, the points or patterns of light are captured by two or more cameras on a camera bar. In an embodiment, the light point accessory includes reflective spots illuminated by a light source.

Figure 4:
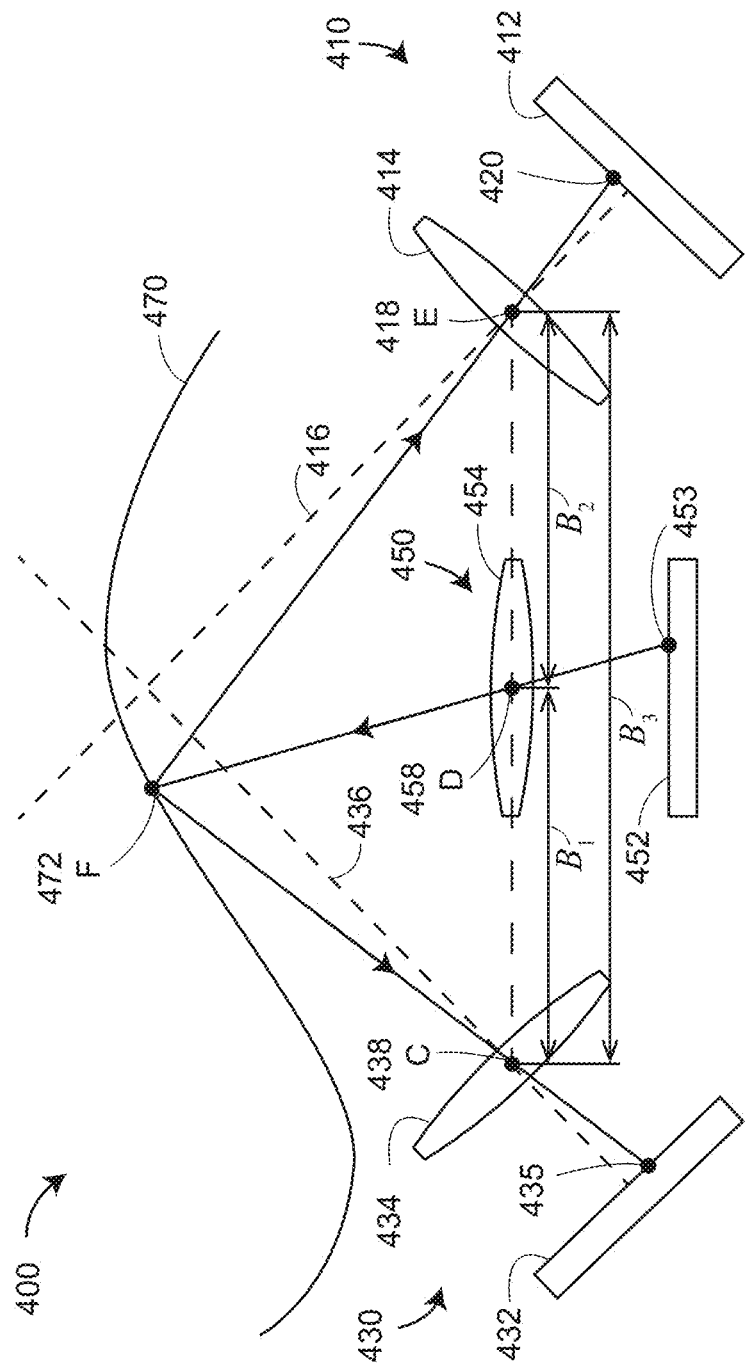
FIG. 4 is a schematic illustration of the principle of operation of a triangulation scanner having a projector and two cameras according to an embodiment of the present invention.

FIG. 4 is a schematic representation of a structured light triangulation scanner 400 having a projector 450, a first camera 410, and a second camera 430. In an embodiment, the projector creates a pattern of light on a pattern generator plane 452. A ray of light is projected from a corrected point 453 on the pattern generator plane 452 through the projector perspective center 458 (point D) of the lens 454 onto an object surface 470 at a point 472 (point F). The point 472 is imaged by the first camera 410 by receiving a ray of light from the point 472 through a perspective center 418 (point E) of a lens 414 onto the surface of a photosensitive array 412 as a corrected point 420. The point 420 is corrected in the read-out data by applying a correction factor to remove the effects of aberrations of lens 414. The point 472 is likewise imaged by the second camera 430 by receiving a ray of light from the point 472 through a perspective center 438 (point C) of the lens 434 onto the surface of a photosensitive array 432 of the second camera as a corrected point 435. The point 435 is similarly corrected in the read-out data by applying a correction factor to remove the effects of aberrations of lens 434.

The inclusion of two cameras 410 and 430 in the system 400 provides advantages over the device of FIG. 2 that includes a single camera. One advantage is that each of the two cameras has a different view of the point 472 (point F). Because of this difference in viewpoints, it is possible in some cases to see features that would otherwise be obscured in a single camera system—for example, seeing into a hole or behind a blockage. In addition, it is possible in the system 400 of FIG. 4 to perform three triangulation calculations rather than a single triangulation calculation, thereby improving measurement accuracy relative to the single camera system. A first triangulation calculation can be made between corresponding points in the two cameras using the triangle CEF with the baseline $B_3$. A second triangulation calculation can be made based on corresponding points of the first camera and the projector using the triangle DEF with the baseline $B_2$. A third triangulation calculation can be made based on corresponding points of the second camera and the projector using the triangle CDF with the baseline $B_1$. The optical axis of the first camera 410 is line 416, and the optical axis of the second camera 430 is line 436.

Figure 5:
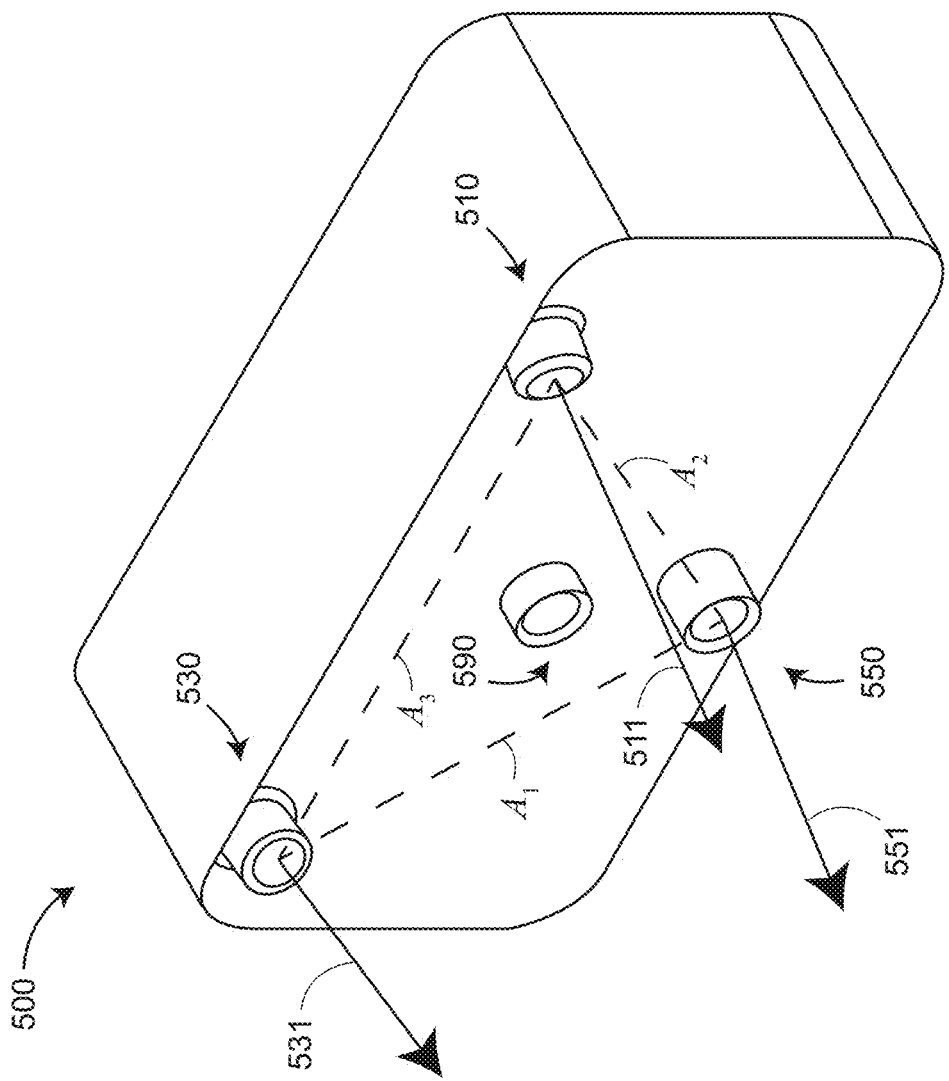
FIG. 5 is an isometric illustration of a triangulation scanner having a projector and two triangulation cameras arranged in a triangular pattern and further including a registration camera according to an embodiment of the present invention.
Figure 6B:
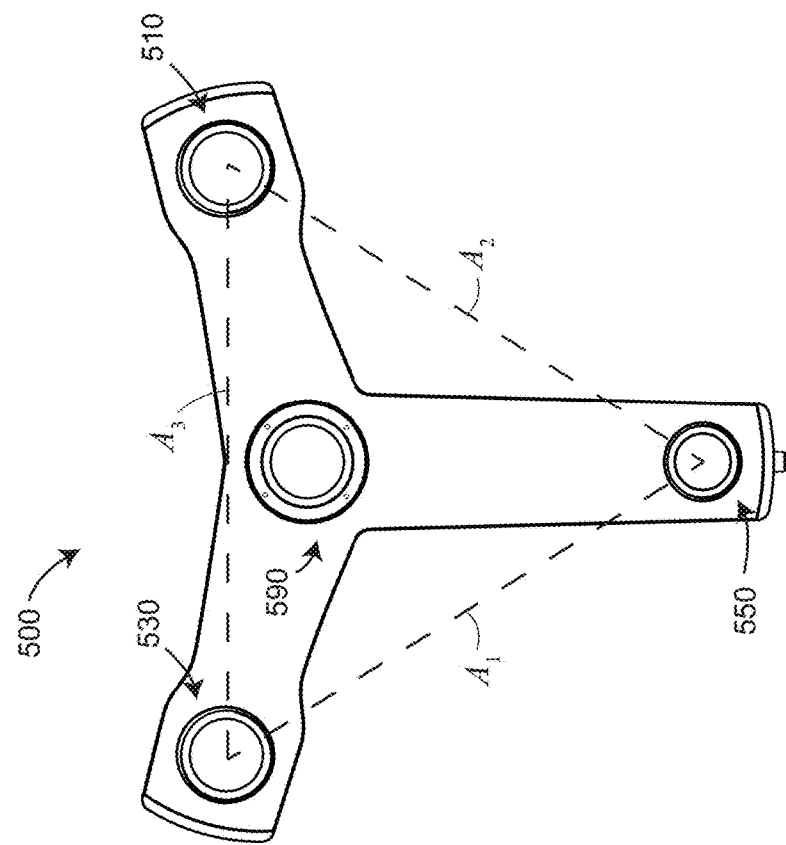
FIG. 6A and FIG. 6B are perspective and front views of a handheld triangulation scanner according to an embodiment of the present invention.
Figure 6A:
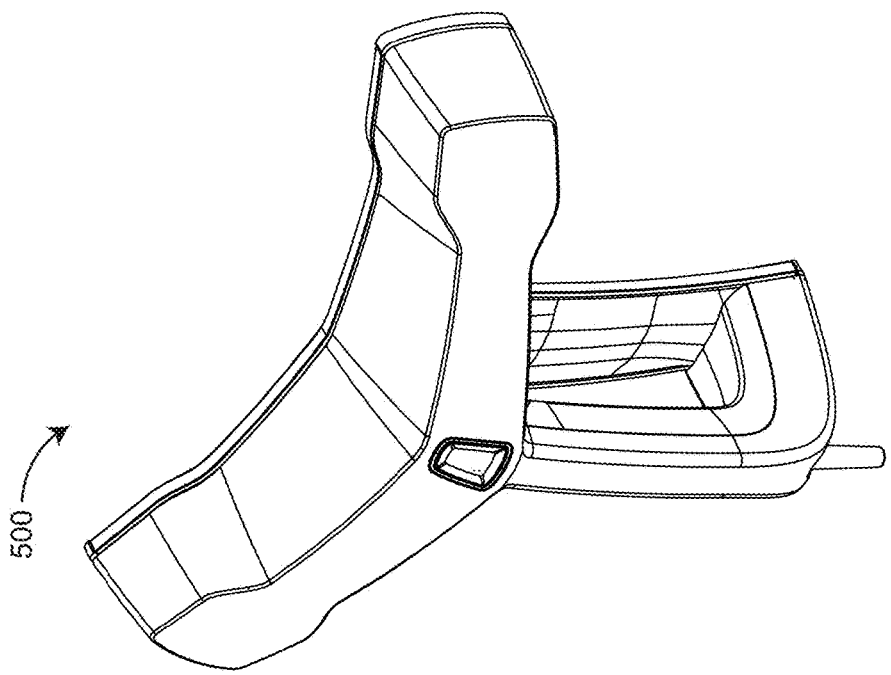

FIG. 5, FIG. 6A and FIG. 6B show a triangulation scanner (also referred to as a 3D imager) 500 having two cameras 510, 530 and a projector 550 arranged in a triangle $A_1$-$A_2$-$A_3$. In an embodiment, the 3D imager 500 of FIG. 5 further includes a camera 590 that may be used to provide color (texture) information for incorporation into the 3D image. In addition, the camera 590 may be used to register multiple 3D images through the use of interest points (sometimes referred to as videogrammetry if the measured object is moving relative to the scanner 500). The lines 511, 531, 551 represent the optical axes of the camera 510, the camera 530, and the projector 550, respectively.

This triangular arrangement provides additional information beyond that available for two cameras and a projector arranged in a straight line as illustrated in FIG. 4. The additional information is provided through additional mathematical constraints provided by epipolar relationships among the projector 550 and the cameras 510, 530.

The scanner 500 may be a handheld scanner as illustrated in perspective and front views in FIGS. 6A, 6B, respectively. In an embodiment, the projector 550 projects an uncoded pattern of light, the correspondence between the projector 550 and the cameras 510, 530 being determined using mathematical epipolar relations. In an embodiment, the camera 590 is a registration camera that registers multiples frames of data by matching successive interest points (using videogrammetry).

Figure 7A:
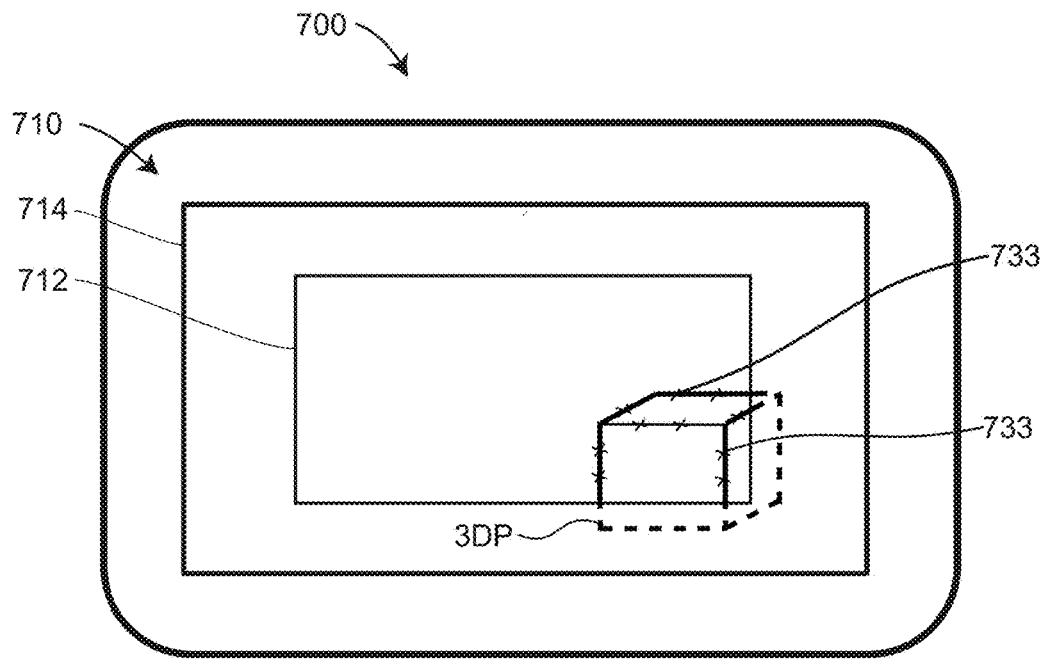
FIGS. 7A, 7B illustrate display images used in conjunction with a triangulation scanner to show both 2D image data and determined 3D coordinates according to an embodiment of the present invention.

FIG. 7A illustrates an embodiment in which a display unit 700 is used with the scanner 500 to register determined 3D data points. In an embodiment, the display unit 700 includes a display area 710 subdivided into a first display part 712 and a second display part 714. In an embodiment, the first display part 712 is a central part of the display area 710, and the second display part 714 is a peripheral area around the first display part 712.

In an embodiment, the first display part 712 shows a video live image VL. In an embodiment, the video live image VL is based on 2D images captured by the camera 590. In an embodiment, the second display part 714 shows 3D points obtained from triangulation scanner components 510, 530, 550. The 3D points in the second display part 714 are registered together based at least in part on the 2D images captured by the camera 590. Although this description is given for the scanner 500, it should be appreciated that such a display may be used with any triangulation scanner, even a scanner having a single camera and a single projector. As the video live image VL changes, such as when the user moves the device 500, the image of the 3D point cloud 3DP in the second display part 714 changes correspondingly to reflect the change in position and orientation of the device 500. It should be appreciated that the placement of the image of the three-dimensional point cloud 3DP around the periphery of the video live image VL provides advantages in allowing the user to easily see where additional scanning may be performed while viewing the display area 700.

Figure 7B:
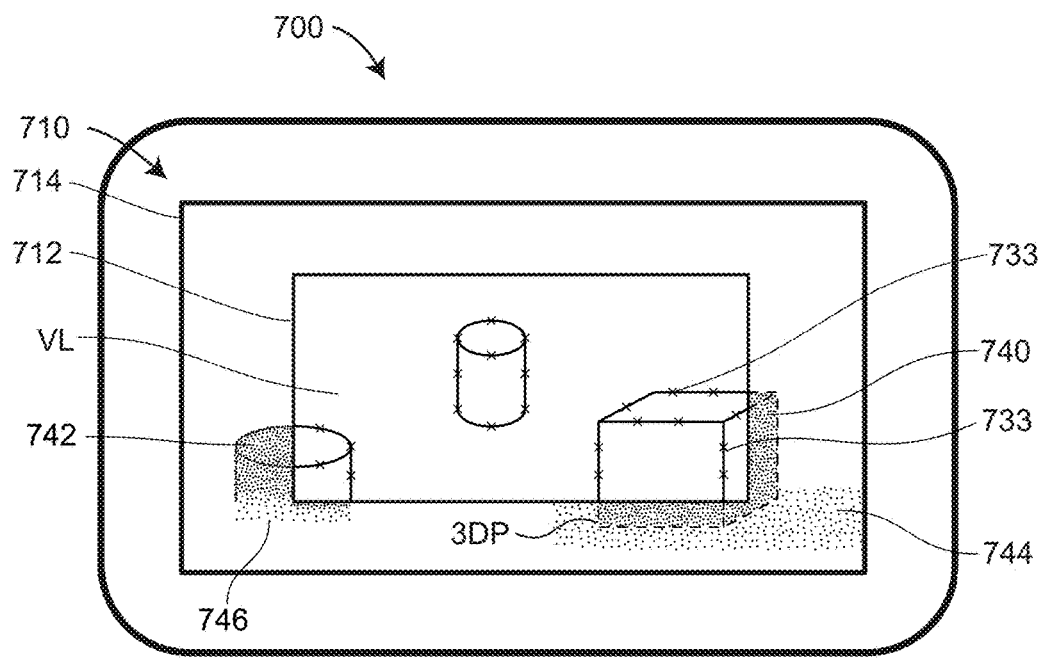

Referring now to FIG. 7B, it can be seen that during a scanning operation, areas 740, 742 have a high density of points that allow for a representation of an object at a desired accuracy level. The user will be able to observe that other areas 744, 746 have lower point densities. The user may then determine whether additional scanning needs to be performed. For example, area 744 may be a table top where a generally low density of points may be acceptable. The user may determine that another area 746, for example, may perform additional scanning since the object has not been completely captured.

In an embodiment illustrated in FIGS. 7A, 7B, flags or marks 733 are inserted in the first display part 712 to support registration of 3D scans. The marks 733 may be a symbol such as a small "x" or "+" for example. The marks 733 are used to indicate structures (i.e., possible targets) recognized by processors (such as the processors 24, 25, 26 in FIG. 1) of the scanner 500. The recognizable structures can be points, corners, edges or textures of objects. Points associated with the marks 733 are sometimes referred to as "interest points." To enable registration, a correspondence is established among interest points in a plurality of the captured 2D images.

The use of the latest video live image VL provides advantages in that the registration process does not have to be performed as frequently. If the marks 733 have a high density, it is considered to be a successful registration of the 3D scans. If, however, a lower density of the marks 733 is recognized, additional 3D scans may be performed using a relatively slow movement of the 3D measuring device 100. By slowing the movement of the device 100 during the scan, additional or higher density points may be acquired.

Figure 8A:
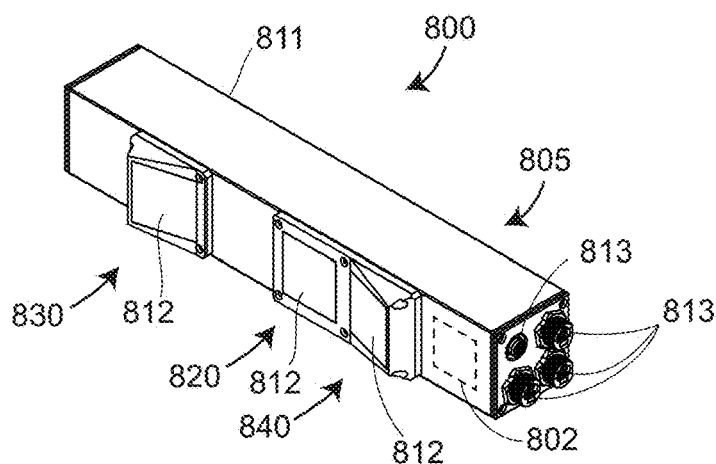
FIGS. 8A, 8B, 8C are isometric, top, and isometric views, respectively, of a 3D triangulation scanner according to an embodiment of the present invention.
Figure 8B:
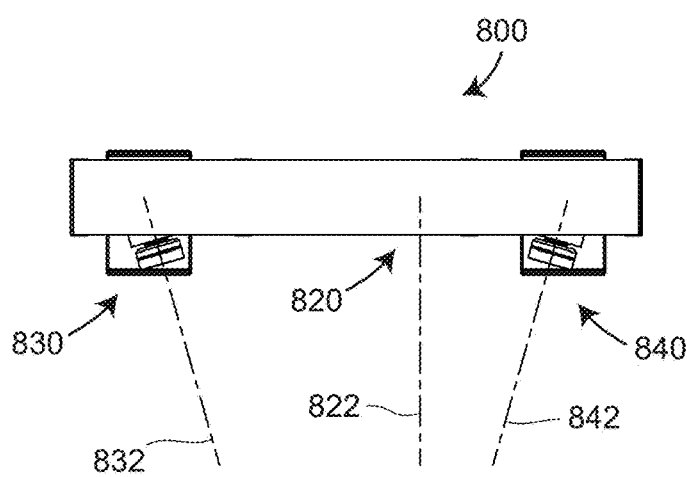
Figure 8C:
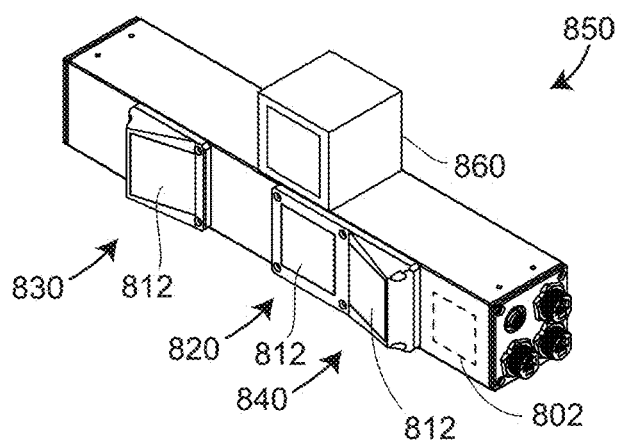

FIGS. 8A, 8B are isometric views of a triangulation scanner 800 having a body 805, a projector 820, a first camera 830, and a second camera 840. In an embodiment, the projector optical axis 822 of the projector 820, the first-camera optical axis 832 of the first camera 830, and the second-camera optical axis 842 of the second camera 840 all lie on a common plane, which is a plane parallel to the viewing plane (the plane of the "paper") of FIG. 8B. In most cases, an optical axis passes through a center of symmetry of an optical system, which might be a projector or a camera, for example. For example, an optical axis may pass through a center of curvature of lens surfaces or mirror surfaces in an optical system. In an embodiment, the body 805 includes a dress cover 811, windows 812 for the projector and cameras, and electrical connectors 813. The triangulation scanner 800 shown in FIG. 8B is the same as the triangulation scanner 800 shown in FIG. 8A, but elements of the body 805 such as the dress cover 811 and the windows 812 have been left off the view of FIG. 8B. In an embodiment, the triangulation scanner 800 includes a processor 802 used to determine object 3D coordinates. The triangulation scanner 850 of FIG. 8C is the same as the triangulation scanner 800 except that an additional camera 860 has been added. In an embodiment, the camera 860 is a color camera used to colorize 3D images and also to assist in registration of multiple images when needed, for example, when mounted on a robot or when viewing objects moving on a conveyor belt.

In an embodiment, the projector 820 in FIGS. 8A, 8B, 8C projects uncoded spots of light in an uncoded pattern. In an embodiment, the processor 802 determines correspondence among such projected spots based on the 3D constraints imposed by the 3D geometry of FIG. 4. In another embodiment, the projector 820 projects a coded pattern of light. In an embodiment, the processor 802 determines correspondence among elements in the images of the cameras 830, 840 based at least in part on the matching of the coded image elements in the images.

A difficulty sometimes encountered by triangulation scanners of the sort discussed herein above in FIGS. 1-8 is loss of accuracy in determined 3D coordinates because relative high brightness of background light. A common example of such relatively high brightness background light is sunlight. The optical power of the projected light is limited by laser and LED safety standards and also by the availability of suitable light sources. At the same time, the exposure time needs to be kept short to avoid saturation by the sunlight. In this situation, the amount of projected light received by the camera array may be relatively small compared to the sunlight, resulting in relatively low accuracy in measured 3D coordinates.

FIGS. 9A, 9B, 9C, 9D illustrate an apparatus and method for minimizing this difficulty. Triangulation scanner 900 includes a projector 910 and a camera 920. The projector 910 includes a light source 911 that is turned ON and OFF at equal intervals Δt. In an embodiment, the pattern is sent to a pattern generator 912. In an embodiment, the pattern generator 912 is a glass slide having a pattern. In another embodiment, the pattern generator 912 is a digital micromirror device (DMD) that projects the light from the light source 911 off small micromirror segments to create the desired pattern. In another embodiment, the pattern generator 912 is a liquid crystal on glass (LCoS) array. In another embodiment, the pattern generator 912 is a diffractive optical element (DOE). In other embodiments, other types of pattern generators 912 are used. In an embodiment, the projector communicates with a processor 902 through communication channel 945.

The pattern generator 912 projects the pattern of light through the projector lens 913. In an embodiment, each ray of light 914 is projected through a perspective center 915 of the projector lens. Here it is understood that each modeled ray of light 914 is corrected for aberrations such as the aberrations of the projector lens 913. The ray of light 914 is projected from a point 916 on the pattern generator 912 to a point 936 on the object surface 935.

The camera 920 includes a camera lens 921 and a camera integrated circuit 922. In an embodiment, a ray 937 travels from the object point 936 through the camera perspective center 938 to strike the camera integrated circuit 922 at a point 939. The camera integrated circuit 922, which is also referred to as the camera photosensitive array 922, includes chip-level electronics 931 and an array of pixels 930. Each pixel 930 includes an optical detector 923 and an electrical support element 924. Each electrical support element 924 includes a first accumulator 925, a second accumulator 926, and optionally an arithmetic unit 927. In an embodiment, each electrical support element 924 is connected to the chip-level electronics 931, which communicates with a processor 902 located off the integrated circuit 922. In an embodiment, the chip-level electronics 931 further communicates over a line 944 with the projector light source 911. In an embodiment, the electrical support element 924 further includes a function to reset the accumulators 925, 926.

Figure 9A:
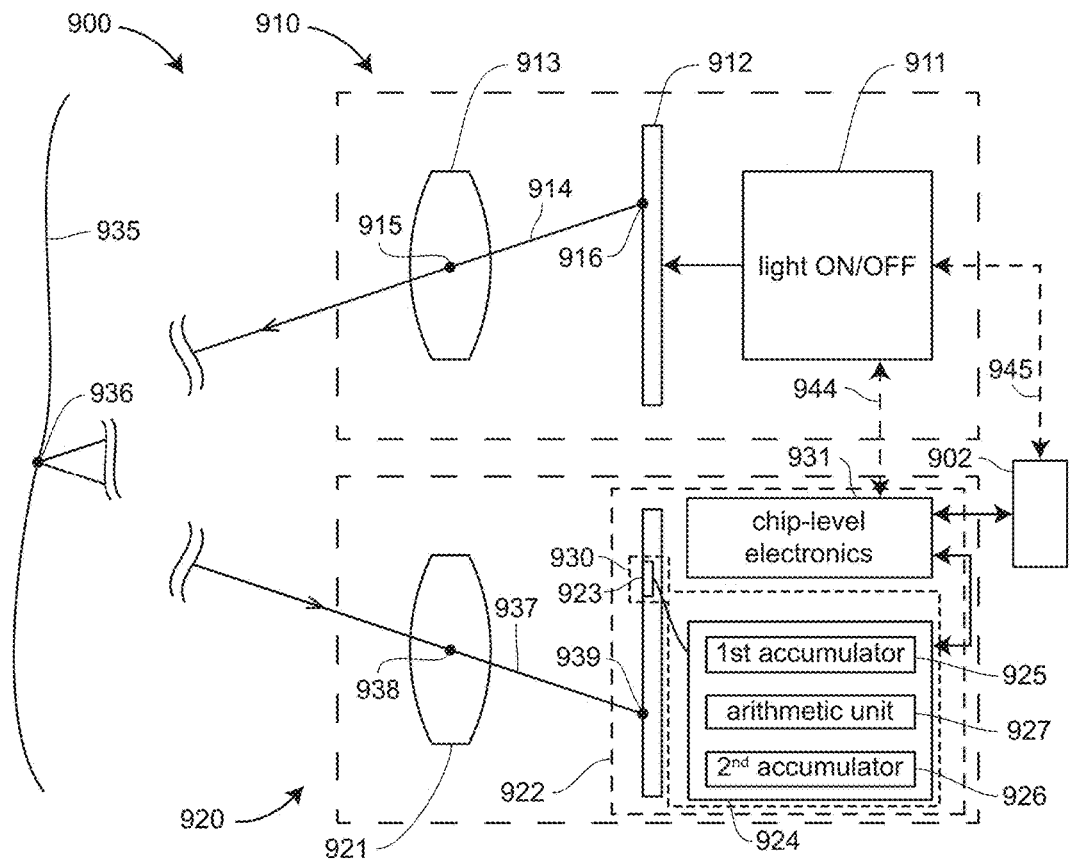
FIG. 9A is a block diagram of a triangulation scanner operating to subtract unwanted background light according to an embodiment of the present invention.
Figure 9B:
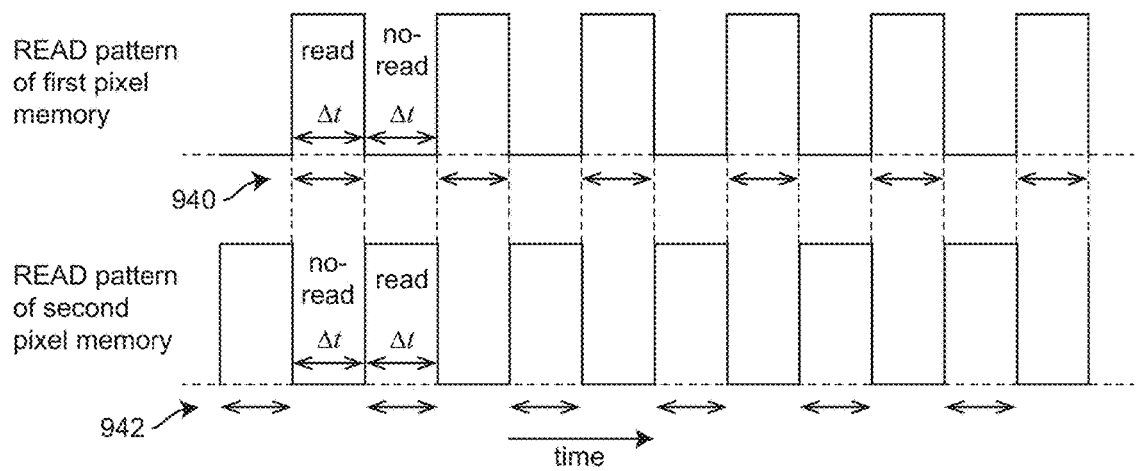
FIG. 9B shows timing of signals received by two camera memories according to an embodiment of the present invention.

In an embodiment illustrated in FIG. 9B, the projector 910 has ON/OFF modes synchronized to cycles of the first accumulator 925 and the second accumulator 926. In an embodiment, the projector 910 produces light during time intervals 940 when the projector in its ON mode, which further corresponds to the READ time (also referred to as the exposure time) of the first accumulator 925 and the NO-READ time of the second accumulator 926. In an embodiment, the projector 910 produces no light during time intervals 942 when the projector is in its OFF mode, which further corresponds to the NO-READ time of the first accumulator 925 and the READ time of the second accumulator 926. In an embodiment, the signals received during the READ time of the first accumulator 925 are summed by the first accumulator 925. The signals received during the READ time of the second accumulator 926 are summed by the first accumulator 926. The summing activity in the elements 925, 926 continues until a prescribed condition is reached, at which time the accumulated values of the elements 925, 926 are optionally processed by the arithmetic unit and then sent to the chip-level electronics 931. In an embodiment, the prescribed condition is completion of an integer number of cycles (e.g., the integer number N). In another embodiment, the prescribed condition is accumulating a level equal to a prescribed level. In another embodiment, an integer N+1 cycles is summed by the first accumulator and an integer number N cycles is summed for the second accumulator. This approach might be used when the time is cut in half for the first and last cycle of the first accumulator, thereby slightly improving the synchronization between the signals received by the first and the second accumulators. In an embodiment, the elements 925, 926 are cleared following the signal transfer to the chip-level electronics 931.

In an embodiment, the arithmetic unit 927 subtracts the value of the second accumulator 926 from the first value of the first accumulator 926 to obtain a net accumulated level. Such a subtraction may be subtraction of one analog signal from another analog signal, for example by sending the signals from the accumulators 925, 926 to two input ports of a differential amplifier. Alternatively, the subtraction may be one digital value from another digital value if digital electronics are implemented at the pixel level. In other embodiments, the subtraction is performed in the chip-level electronics 931 or in the processor 902.

For this case, the level of background light captured in the first accumulated level and the second accumulated level is expected to be nearly the same. Hence the net accumulated level is expected to include mostly the signal from the projected light, with most of the background light cancelled by the subtraction. In an embodiment, the triangulation calculation that determines 3D coordinates of the point 936 on the object surface 935 is based at least in part on the net accumulated level measured by pixels 930 associated with the point 936.

As an example of the advantage to be gained with this method, compare the following two cases. In the first case a traditional triangulation scanner is used, and in the second case a triangulation scanner operates according to embodiments of the invention described with respect to FIGS. 9A, 9B. Suppose that the traditional triangulation scanner operates at a frame rate of 10 Hz, which corresponds to a cycle time of 0.1 second. In a typical case, in bright sunlight photosensitive arrays saturates within 0.1 millisecond. Hence the duty cycle is 0.1 ms/0.1 s=0.001. In the second case a triangulation scanner as described in reference to FIGS. 9A, 9B is used, with the frame rate now set to 5000 Hz, which corresponds to a cycle time of 2 milliseconds. The projector ON cycle then lasts for 1 millisecond and the projector OFF cycle lasts for 1 millisecond. The duty cycle is 1 ms/2 ms=0.5, which is 500 times higher than the duty cycle for the traditional triangulation scanner. The result of the increased duty cycle is a greatly improved signal-to-noise ratio for triangulation scanner described in reference to FIGS. 9A, 9B compared to the traditional triangulation scanner.

In some cases, it may be desirable to make the read times different for the first accumulator and the second accumulator. For example, it would be possible to collect signal plus noise data in first time intervals in the first accumulator and to collect noise data during second time intervals in the second accumulator. In an embodiment, the second time intervals would be to shortened or lengthened in relation to the first time interval. For example, the second time interval might be set to be half as long as first time interval. In this case, to get a meaningful noise subtraction, the accumulated noise captured in the second time intervals would be multiplied by two before subtracting it from the accumulated signal plus noise obtained in the first accumulator. In other words, the first accumulated value and the second accumulated value are each scaled by an amount inversely proportional to the sum of their respective time intervals.

Figure 9C:
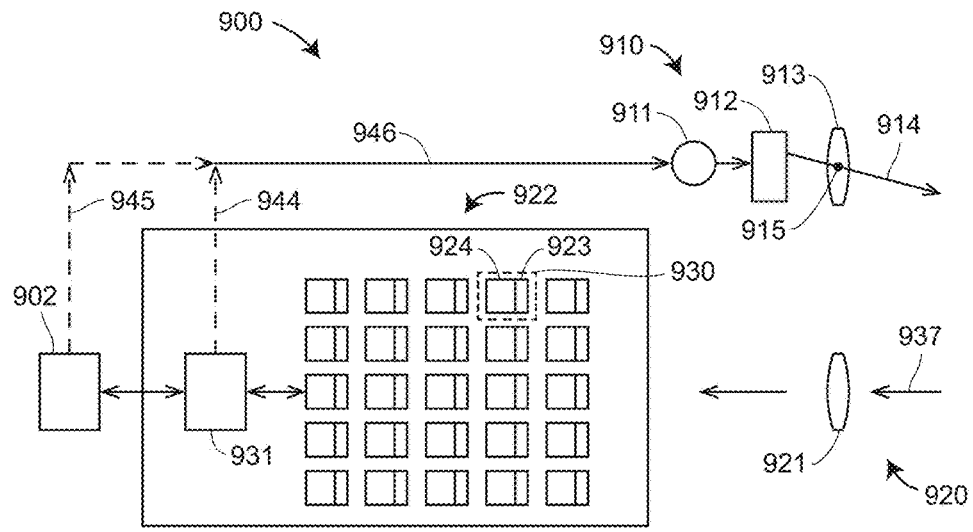
FIG. 9C is a block diagram of a triangulation scanner operating to subtract unwanted background light according to an embodiment of the present invention.

FIG. 9C is a schematic illustration of the triangulation scanner 900. In an embodiment, the projector light source 911 receives an ON/OFF signal over a line 946. In an embodiment, the ON/OFF signal sent over the line 946 is directly initiated by the integrated circuit 922 that synchronizes the turning ON and OFF of the light source 911 with the READ and NO-READ timing of the first accumulator 925 and the second accumulator 926. The ON/OFF signal in this case is sent over the line 944. In another embodiment, the ON/OFF signal sent over the line 946 is initiated by the processor 902. In an embodiment, the processor 902 may receive a synchronization signal from the integrated circuit 922, to which it responds by sending a synchronization signal over the lines 945 and 946 to the light source 911. Alternatively, the processor 902 may send a signal through the interface 931 to the photosensitive array 923a to synchronize the READ and NO-READ cycles, while also sending the synchronization signal over the lines 945, 946 to the light source 911. In an embodiment, the light source 911 is external to a circuit board that holds the integrated circuit 922. In another embodiment, the light source 911 is integrated onto the circuit board that holds the integrated circuit 922.

Figure 9D:
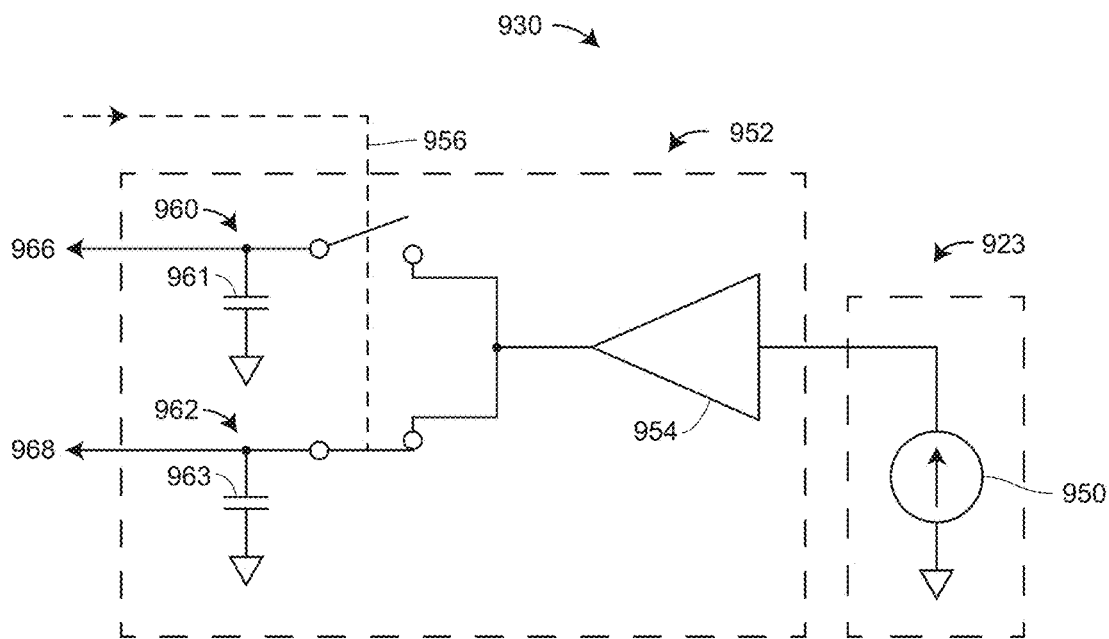
FIG. 9D is a schematic representation of accumulation/memory circuitry according to an embodiment of the present invention.

It should be appreciated that the first accumulator 925 and the second accumulator 926 in the electrical support element 924 may be implemented in a variety of ways. FIG. 9D is a schematic representation of circuit elements within a pixel according to an embodiment. The optical detector 923 of pixel 930 is represented as a current source 950 having an output responsive to the optical power incident on the pixel photodetector. In an embodiment, the electrical support component 924 includes electrical components shown in the dashed box 952. In an embodiment, the output of the optical detector 923 is sent to an amplifier 954. The electrical support element 924 includes a switch function 956 that selects the path that current takes in leaving the amplifier 954. The switch 956 causes current to pass to a first charging circuit 960 or alternatively to the second charging circuit 962. Charge is accumulated in a first capacitor 961 of the first charging circuit and in a second capacitor 963 of the second charging circuit. In the circuit of FIG. 9D, the first capacitor 961 serves as the first accumulator 925 and the second capacitor 963 serves as the second accumulator 929. Note that the capacitors 961, 963 also provide a memory function as well as an accumulation function.

After the prescribed condition for accumulating charge has been achieved, as described herein above, the switch 954 opens to prevent current from reaching either capacitor 961, 963. In an embodiment, a voltage of the first capacitor 961 is read by a first analog-to-digital converter (ADC) channel 966, and the voltage of the second capacitor 958 is read by a second ADC channel 968. In an embodiment, the ADCs are implemented at the pixel level, which is to say that each pixel has dedicated ADC circuitry. In another embodiment, the ADCs are implemented at the column level. In another embodiment, the ADCs are implemented at the chip level. In another embodiment, digital components such as counters are used instead of analog components such as capacitors to provide a digital accumulation function, thereby eliminating the need for a separate analog-to-digital conversion.

It should be appreciated that the term accumulator as used in the expressions first accumulator and second accumulator refers to any collection of components that increases or accumulates analog or digital quantities associated with acquired data.

Figure 10:
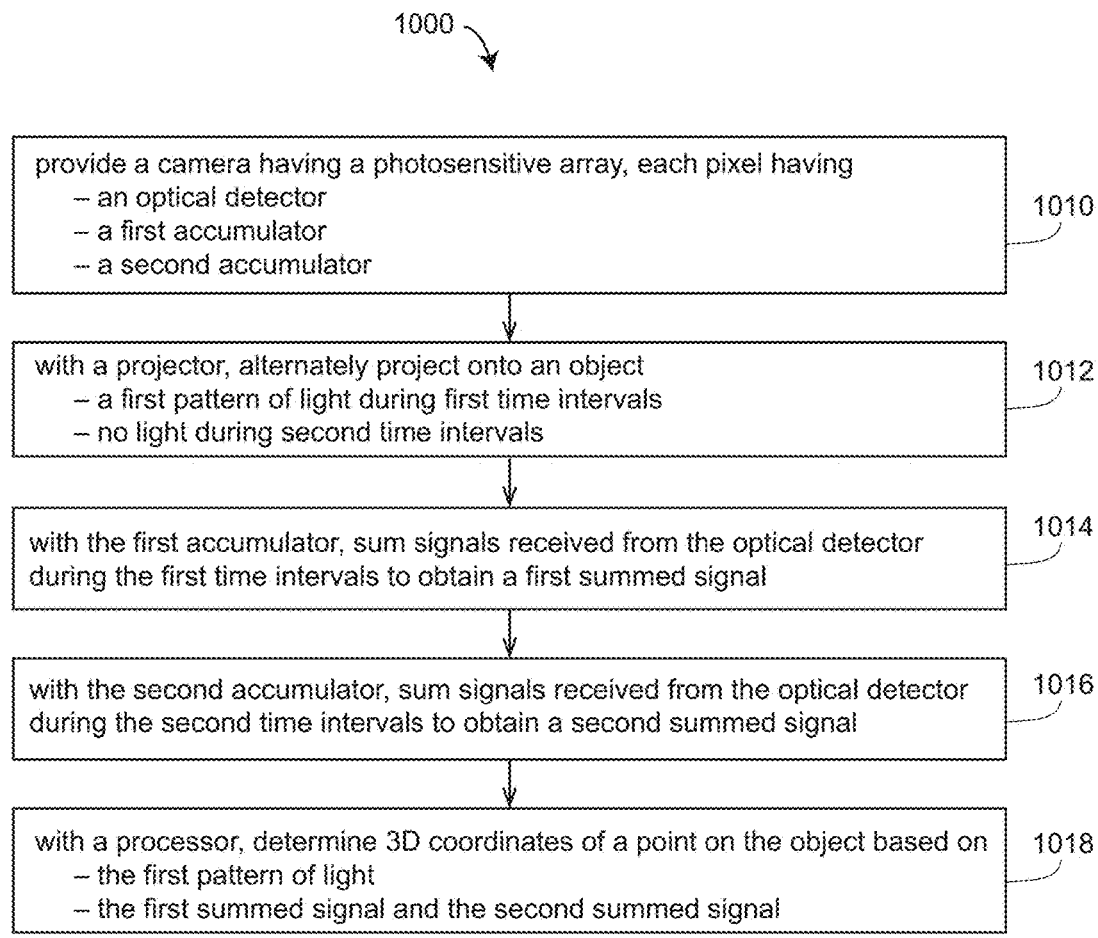
FIG. 10 is a flow chart showing elements of a method for removing unwanted background light according to an embodiment of the present invention.

FIG. 10 describes a method for determining 3D coordinates according to an embodiment of the present invention. In an element 1010, there is provided a camera having a photosensitive array, each pixel of the photosensitive array including an optical detector, a first accumulator, and a second accumulator. In an element 1012, a projector alternatively projects onto an object a first pattern of light during first time intervals and a second pattern of light during second time intervals. In an element 1014, a first accumulator sums signals received from the optical detector during the first time intervals to obtain a first summed signal. In an element 1016, a second accumulator sums signals received from the optical detector during the second time intervals to obtain a second summed signal. In an element 1018, a processor determines 3D coordinates of a point on the object based on the first pattern of light and on a difference in the first summed signal and the second summed signal.

Because the camera 920 alternately captured an image during the first time intervals and the second time intervals, it may select one of the captured first images to use in additional ways—in particular, for use in tracking, photogrammetry, colorization, or grayscale overlay. The term "tracking" as applied here refers to the ability to follow movement in the triangulation scanner 900 or the object under investigation from frame-to-frame. One way that such tracking may be achieved is to note the location of interest points in the captured first image. Such interest points were described in reference to FIGS. 7A, 7B. Successive registration of first images based on registering of the collected first images provides the tracking capability.

The term photogrammetry as applied here may refer to the tracking-type photogrammetry as described in the preceding paragraph, or it may refer to a dense photogrammetry capable of extracting detail and texture to supplement captured 3D object coordinates. Such dense photogrammetry when combined with the determined 3D coordinates determined by photogrammetry provides a type of augmented reality, which may be further supplemented by drawn or superimposed objects taken from a database. Further enhancement of captured 3D images is possible by applying colorization to the images, if the camera 920 is a color camera or by applying grayscale enhancement if the camera is a black-and-white camera.

Figure 11:
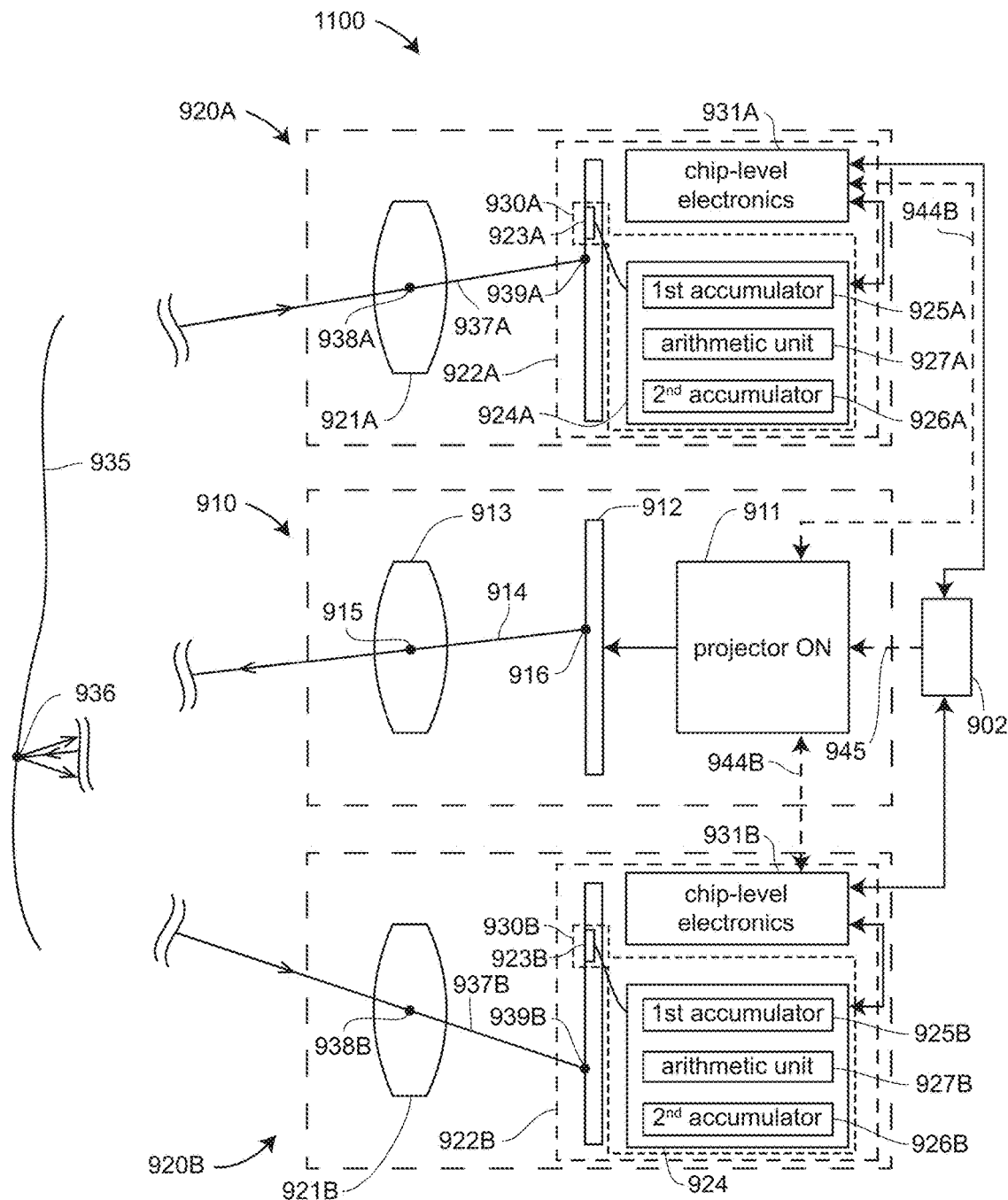
FIG. 11 is a block diagram of a 3D measuring device having two cameras and a projector operating in a first mode according to an embodiment of the present invention.
Figure 12:
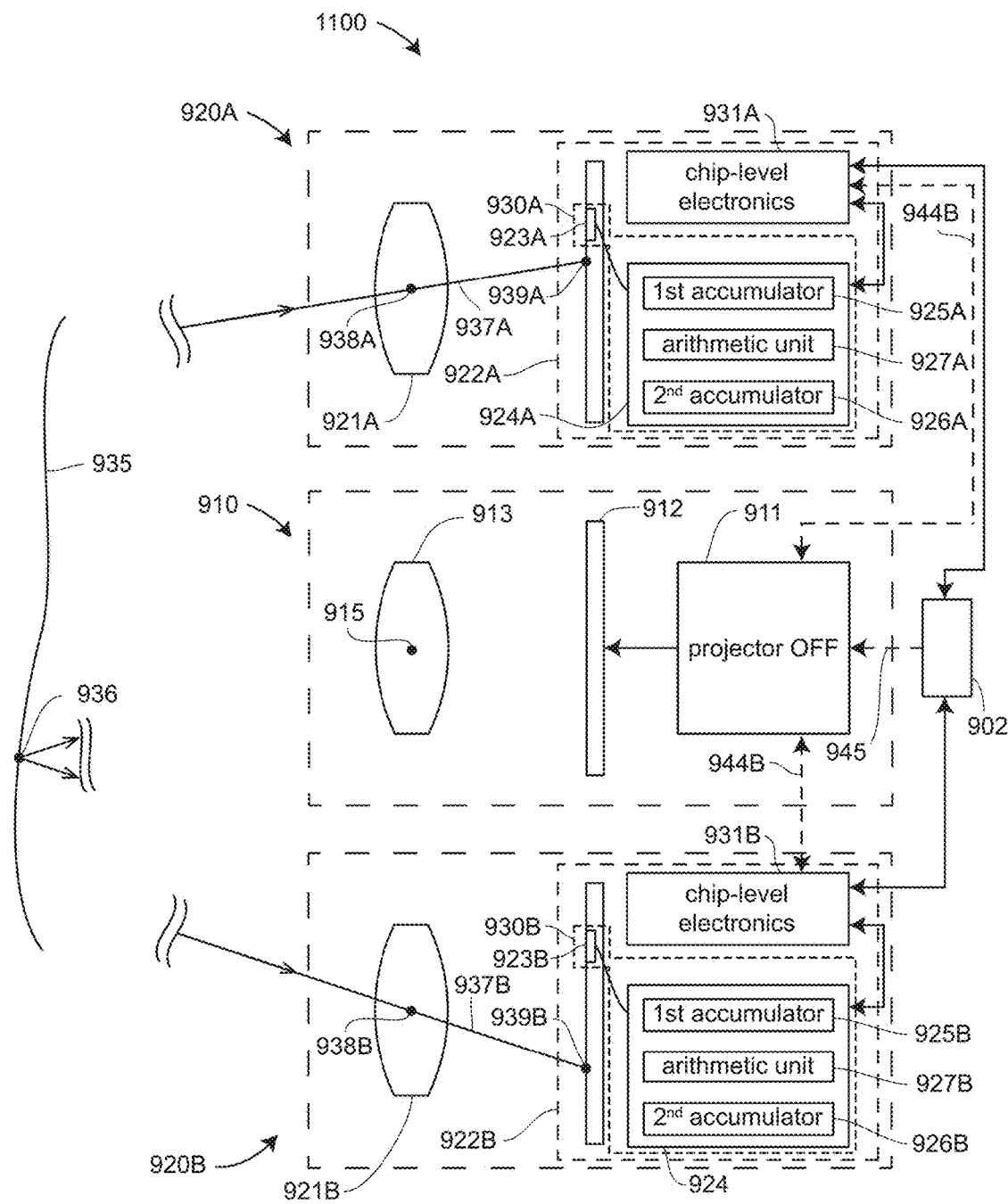
FIG. 12 is a block diagram of a 3D measuring device having two cameras and a projector operating in a second mode according to an embodiment of the present invention.

FIGS. 11, 12 illustrate a triangulation scanner 1100 similar to that triangulation scanner 900 of FIGS. 9A, 9C except that the triangulation scanner 1100 includes two triangulation cameras 920A, 920B rather than a single triangulation camera 920. In embodiments of the present invention, the triangulation scanner 1100 is one of the triangulation scanners illustrated in FIGS. 4, 5, 6A, 6B, 8A, 8B, 8C. In other embodiments, other triangulation scanner configurations are used.

As in FIGS. 9A, 9C, the projector 910 includes a light source 911 that is turned ON and OFF at equal intervals. FIG. 11 shows the projector light source 911 in the ON state, and FIG. 12 shows the light source 911 in the OFF state. In FIGS. 11, 12, each element in camera 920A includes a suffix "A" but otherwise corresponds to an element in camera 920 of FIG. 9A. For example, the lens 921A in FIG. 11 has a corresponding element 921 in FIG. 9A. Likewise, each element in camera 920B has a corresponding element in camera 900 of FIG. 9A. In an embodiment, the projector light source 911 receives an ON/OFF signal over any of lines 944A, 944B, 945. As in the case of FIGS. 9A, 9C, such signals may be initiated by processor 902 or by chip-level electronics 931A, 931B.

A difficulty sometimes encountered by triangulation scanners of the sort discussed herein above in FIGS. 1-8 is loss of accuracy in determined 3D coordinates because of a relatively large difference in the brightness of returned light levels. For example, a reflectance of light may be relatively high from a white object but relatively low from a dark black object or from a shiny object. This relatively large difference in returned light level may result in a triangulation scanner obtaining relatively high 3D accuracy in those regions for which reflectance is high but relatively low 3D accuracy in those regions for which reflectance is low. On the other hand, if reflected light levels are higher than anticipated, optical detectors in a photosensitive array may saturate, resulting in poor 3D accuracy in the saturating regions of the scanned object.

Figure 13A:
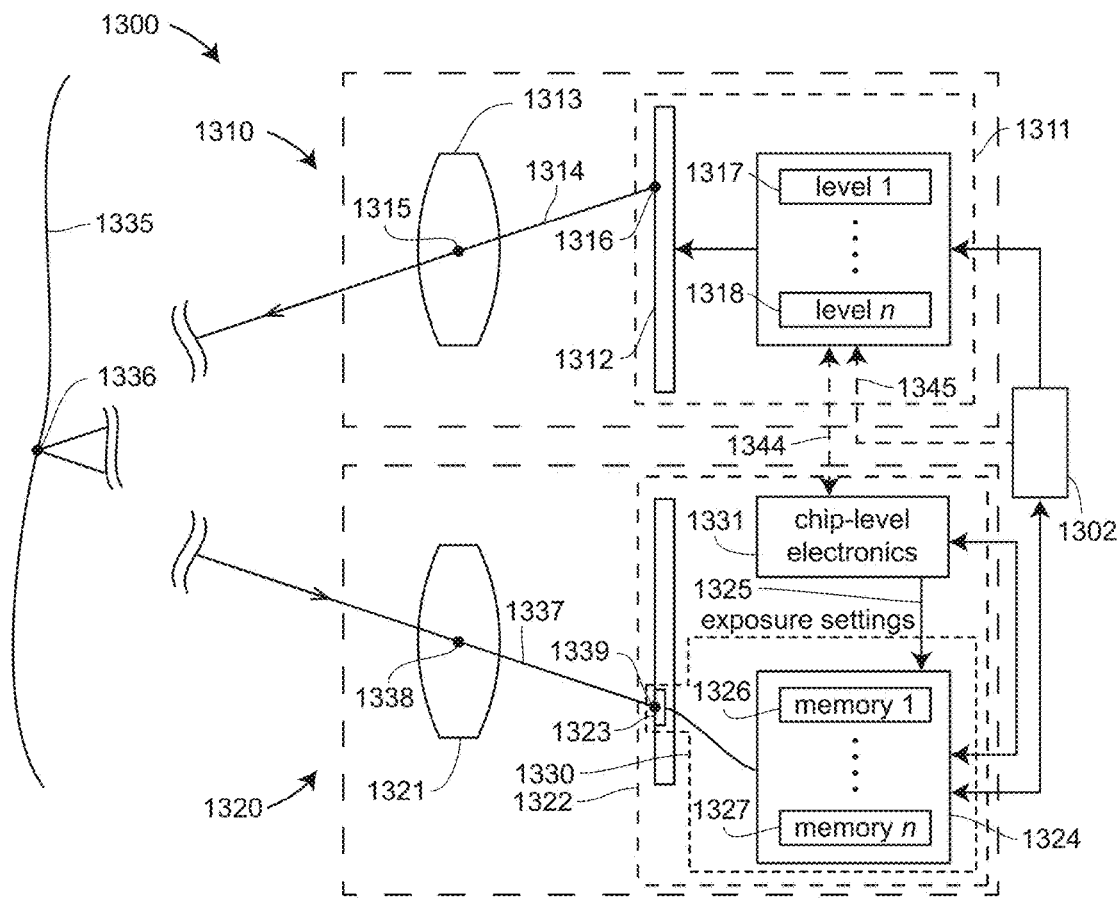
FIG. 13A is a block diagram showing elements of a triangulation scanner having increased dynamic range according to an embodiment of the present invention.

FIG. 13A illustrates an apparatus and method for minimizing this difficulty. Triangulation scanner 1300 includes a projector 1310 and a camera 1320. The projector 1310 includes a projector source 1311 that produces a pattern emitted from a surface 1312. In an embodiment, the pattern is created by a pattern generator within the projector source 1311. In another embodiment, the pattern is created by a glass slide within the projector source 1311. In another embodiment, the pattern is created by a digital micromirror device (DMD) within the projector source 1311. The DMD projects light off small micromirror segments to create the desired pattern. In another embodiment, the pattern is created by a liquid crystal on silicon (LCoS) array within the projector source 1311. In another embodiment, the pattern is created by a diffractive optical element (DOE) within the projector source 1311. In other embodiments, the pattern is created by other types of elements within the projector source 1311. In an embodiment, the projector 1310 communicates with a processor 1302 through communication channel 1345.

The projector source 1311 projects the pattern of light through the projector lens 1313. In an embodiment, each ray of light 1314 is projected through a perspective center 1315 of the projector lens. Here it is understood that each modeled ray of light 1314 is corrected for aberrations such as the aberrations of the projector lens 1313. The ray of light 1314 is projected from a point 1316 on the surface 1312 to a point 1336 on the object surface 1335.

The camera 1320 includes a camera lens 1321 and a camera integrated circuit 1322. In an embodiment, a ray 1337 travels from the object point 1336 through the camera perspective center 1338 to strike the camera integrated circuit 1322 at a point 1339. The camera integrated circuit 1322 includes a camera photosensitive array of pixels 1330 and chip-level electronics 1331. Each pixel 1330 includes an optical detector 1323 and an electrical support element 1324 that includes a plurality of memory elements, including a first memory element 1326 through an $n^{th}$ memory element 1327. The term memory element here means an information storage element within a pixel that retains information about a light level received by the pixel in an interval of time. In an embodiment, the memory elements 1326, 1327 include analog electrical components such as a plurality of capacitors and a switching unit illustrated in FIG. 9D. In an embodiment, each plurality of pixels within the electrical support element 1324 is connected to the chip-level electronics 1331, which communicates with a processor 1302 located off the integrated circuit 1322. In an embodiment, the chip-level electronics 1331 further communicates over a line 1344 with the projector light source 1311. In an embodiment, the electrical support element 1324 further includes a function to reset the memory elements in the electrical support unit 1324.

The projector 1310 projects an optical pattern from the surface 1312. In an embodiment, the projector optionally includes capability to project a plurality of light levels from 1 to n for the projected pattern. In other words, in this embodiment, elements of the projected pattern (e.g., projected spots) retain the same relative light levels but with the projector having the capability of increasing or decreasing the light level of the projected pattern proportionally over all pattern elements over the surface 1312. In an embodiment, all of the memory elements from 1 to n in a pixel 1330 receive the same exposure settings 1325. Increased dynamic range is possible with this setting as long as the projector 1310 is operable to project differing light levels from level 1 to level n.

In another embodiment, the memory elements from 1 to n receive exposure settings 1325 that differ for the n memory elements in the pixel 1330. Increased dynamic range is possible in this case even if the projector source 1311 includes single light level—in other words, a first light level 1317. It is also possible to obtain increased dynamic range by using multiple projected light levels from the first light level 1317 to the $n^{th}$ light level 1318 while, at the same time, using multiple exposure settings from relatively short exposures to relatively long exposures.

The result the use of multiple projection levels or multiple exposure settings or both is a collection of different light levels recorded by the n memories in the pixel 1330. In an embodiment, that stored memory value is selected that, among the n memories, has the largest signal level below the saturation region of the pixel. Each of the obtained signal levels are scaled by a processor such as the processor 1302 into an overall camera image. The scaling performed by the processor accounts for any differences in the projected light level and the selected exposure settings. The result is an image having higher dynamic range than would otherwise be possible. The resulting image would capture with relatively high fidelity reflections whether relatively weak or relatively strong. The result is greater accuracy in determining 3D coordinates for objects having a combination of low-reflectance regions and high-reflectance regions.

An alternative to the apparatus and method described with respect to FIG. 13A would be to store detected light levels in external memory following measurement by the photosensitive array at different light levels or different exposure levels. However, such a method uses a relatively long time for electrical pixel values to be transferred into an external memory. In most cases, such transfer occurs relatively slowly over a serial bus. An advantage of the apparatus 1300 and corresponding method described herein above is in being able to move through a large number of projected levels or exposure settings very quickly since the measured values are saved internally for each pixel, thereby eliminated the need for serial transfer out of the photosensitive array. High speed is often important in 3D scanner measurements, such as in embodiments when the scanner is handheld.

Figure 13B:
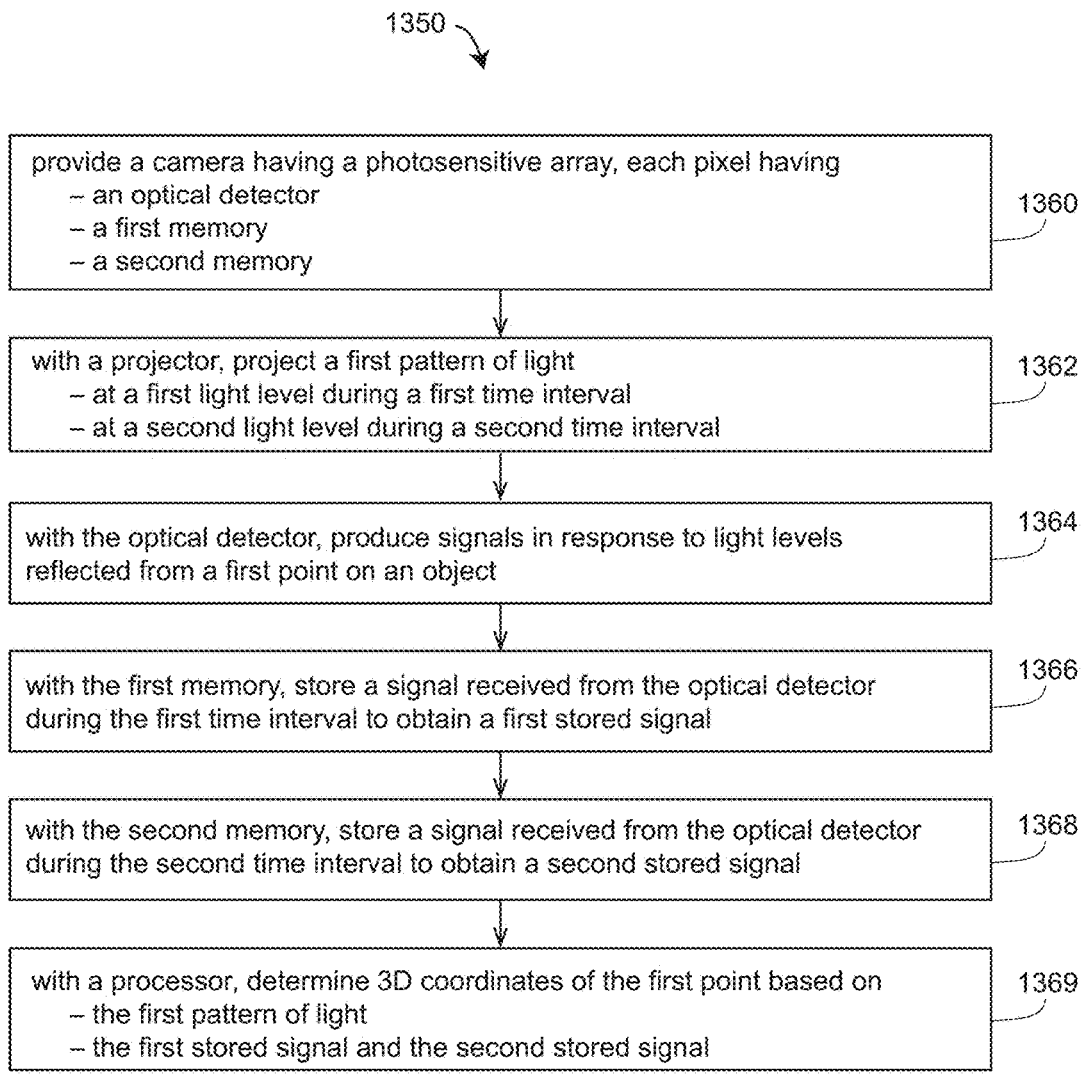
FIGS. 13B, 13C are flow charts showing elements of methods for improving dynamic range according to embodiments of the present invention.
Figure 13C:
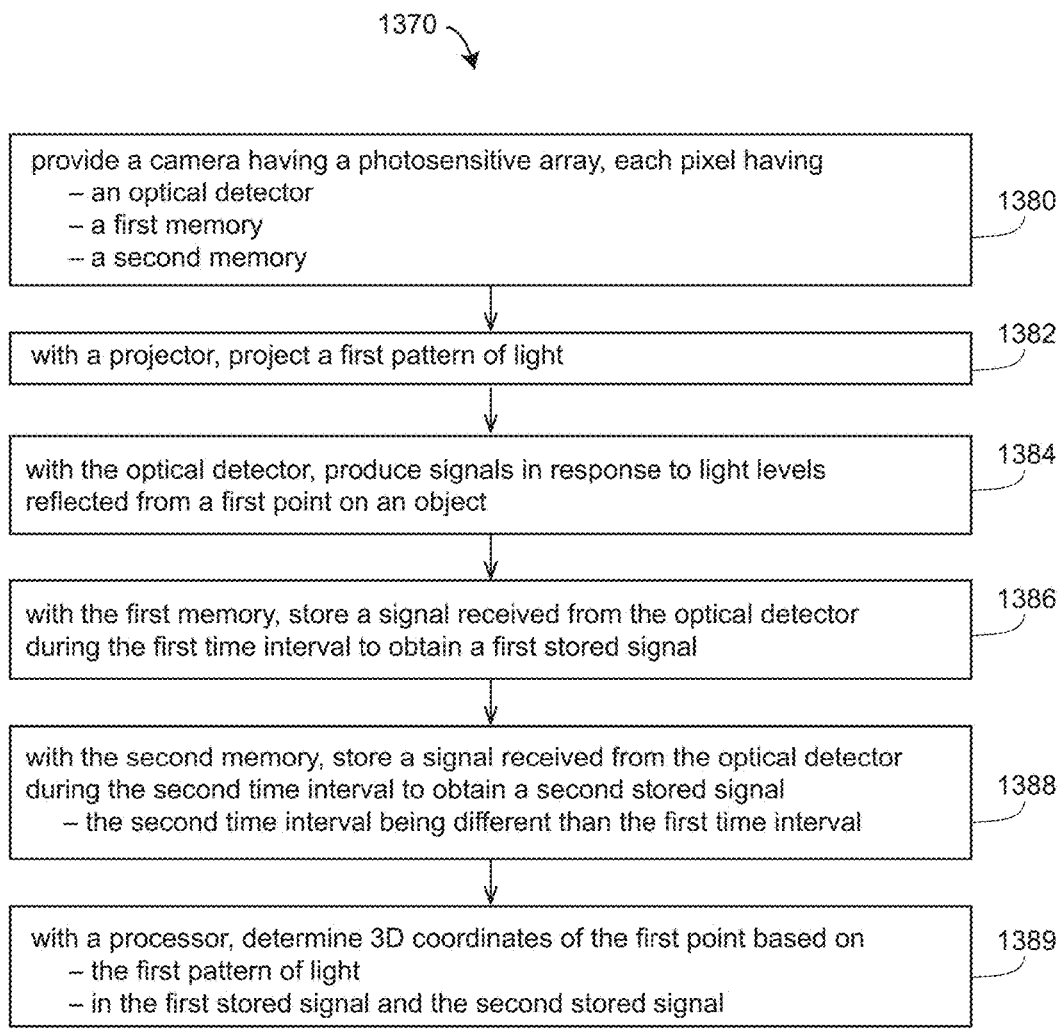

Methods for determining 3D coordinates in accordance with the apparatus of FIG. 13A are described in FIGS. 13B, 13C. In an element 1360 of a method 1350, there is provided a camera having a photosensitive array with pixels, each pixel having an optical detector, a first memory, and a second memory. Here the term memory is synonymous with the term "memory element" and refers to any element capable of retaining information about the level of light received by the optical detector. In an element 1362, a projector projects a first pattern of light with each element of the pattern of light being scaled to a first light level during a first time interval and with each element of the pattern of light being scaled to a second light level during a second time interval. In an element 1364, the optical detector produces signals in response to light levels reflected from a first point on the object. The first point is the point on the object through which a ray passes from the first point through the camera perspective center and intersects the optical detector. In the element 1366, the first memory of the pixel stores a signal received from the optical detector during the first time interval. The resulting stored value is referred to as the first stored signal. In the element 1368, the second memory of the pixel stores a signal received from the optical detector during the second time interval to obtain the second stored signal. Finally, in the element 1369, a processor determines 3D coordinates of the first point on the object based at least in part on the first pattern of light and on the first stored signal and the second stored signal.

In the method described in FIG. 13B, the dynamic range of the captured image points is increased by changing the light level of a projected pattern of light and then capturing those images with a triangulation camera. In this case, the varying light levels enable an increase in dynamic range whether the exposure time differs among images or not. In the method described in FIG. 13C, another embodiment is considered in which the dynamic range of captured image points is increased because of a change in exposure time. Such an increase is possible whether or not there is change in the light levels in different captured images.

A method 1370 for determining 3D coordinates is illustrated in FIG. 13C. In an element 1380, there is provided a camera having a photosensitive array with pixels, each pixel having an optical detector, a first memory, and a second memory. In an element 1382, a projector projects a first pattern of light. In an element 1384, the optical detector produces signals in response to light levels reflected from a first point on the object. The first point is the point on the object through which a ray passes from the first point through the camera perspective center and intersects the optical detector. In the element 1386, the first memory of the pixel stores a signal received from the optical detector during the first time interval. The resulting stored value is referred to as the first stored signal. In the element 1388, the second memory of the pixel stores a signal received from the optical detector during the second time interval to obtain the second stored signal. In this case, the second time interval is different than the first time interval, which is to say that the second exposure time is different than the first exposure time. Finally, in the element 1389, a processor determines 3D coordinates of the first point on the object based at least in part on the first pattern of light and on the first stored signal and the second stored signal.

Another device that also sometimes encounters a loss of accuracy in determined 3D coordinates because of a relatively large difference in the brightness of returned light levels is a 3D stereo camera, or 3D multi-view camera. As in the case discussed previously, the cameras in a stereo camera may receive light from a region of an object having a relatively high reflectance (e.g., a white region) or from a region having relatively low reflectance (e.g., a dark black or shiny region). This relatively large difference in returned light level may result in 3D stereo camera obtaining relatively high 3D accuracy in those regions for which reflectance is high but relatively low 3D accuracy in those regions for which reflectance is low. On the other hand, if reflected light levels are higher than anticipated, optical detectors in a photosensitive array may saturate, resulting in poor 3D accuracy in the saturating regions of the scanned object.

Figure 14A:
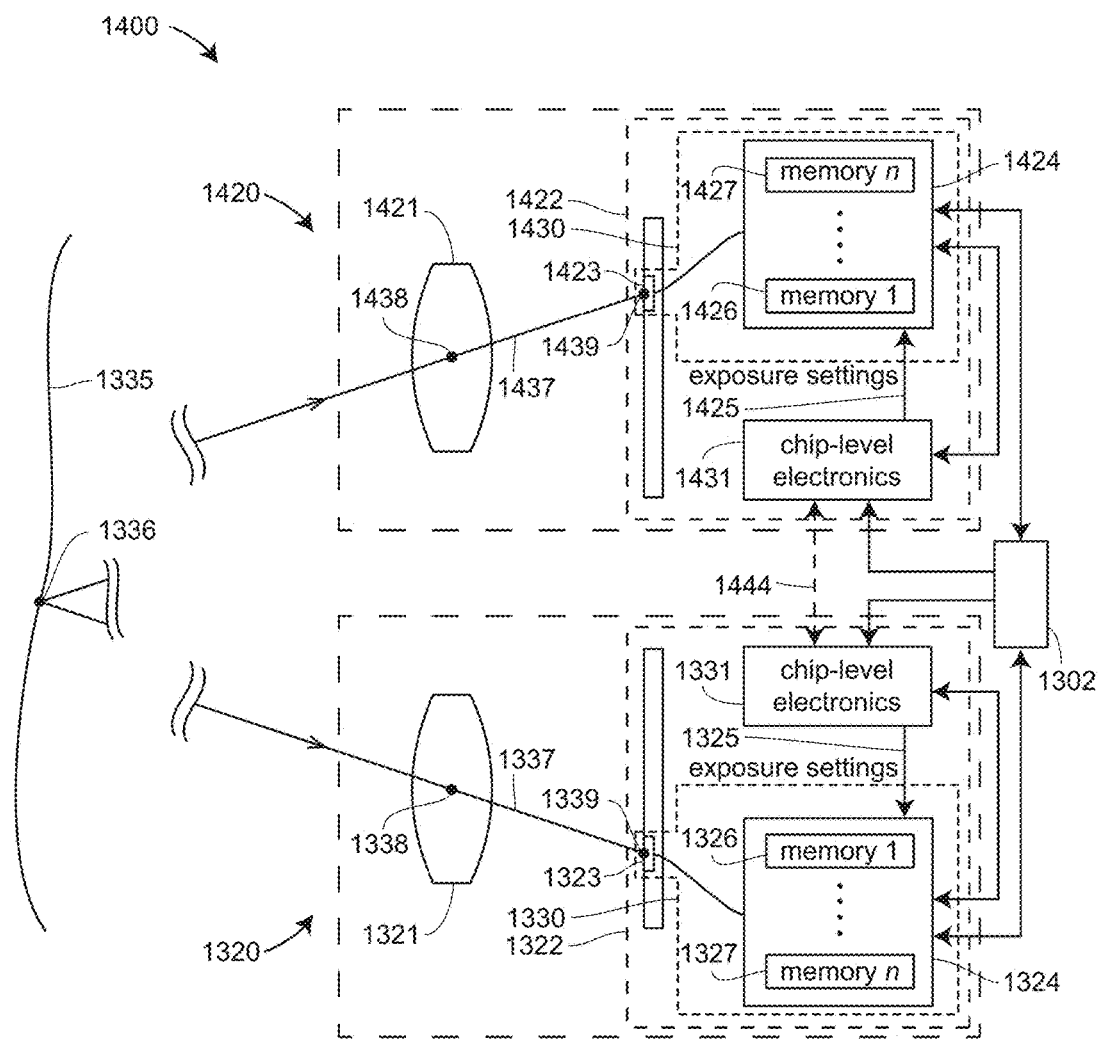
FIG. 14A is a block diagram showing elements of a stereo camera having increased dynamic range according to an embodiment of the present invention.

FIG. 14A illustrates an apparatus and method for minimizing this difficulty. Stereo camera 1400 includes a first camera 1320 and a second camera 1420. The first camera 1320 includes a camera lens 1321 and a camera integrated circuit 1322. In an embodiment, a ray 1337 travels from an object point 1336 through the camera perspective center 1338 to strike the camera integrated circuit 1322 at a point 1339. The camera integrated circuit 1322 includes a camera photosensitive array of pixels 1330 and chip-level electronics 1331. Each pixel 1330 includes an optical detector 1323 and an electrical support element 1324 having a plurality of memory elements, including a first memory element 1326 through an $n^{th}$ memory element 1327. The term memory element here means an information storage element within a pixel that retains information about a light level received by the pixel in an interval of time. In an embodiment, the memory elements 1324 include analog electrical components such as a plurality of capacitors and a switching unit illustrated in FIG. 9D. In an embodiment, each plurality of pixels within the electrical support element 1324 is connected to the chip-level electronics 1331, which communicates with a processor 1302 located off the integrated circuit 1322. In an embodiment, the electrical support element 1324 further includes a function to reset the memory elements in the electrical support unit 1324.

In an embodiment, the memory elements from 1 to n receive exposure settings 1325 that differ for the n memory elements in the pixel 1330. The different signals generated by the optical detector 1323 in response to the different exposure settings 1325 results in the memory elements 1-n having different stored values. In other words, it is possible to obtain increased dynamic range by using multiple exposure settings from relatively short exposures to relatively long exposures.

The result of multiple exposure settings is a collection of different light levels recorded by the n memories in the pixel 1330. In an embodiment, the stored memory value is selected that, among the n memories, has the largest signal level below the saturation region of the pixel. Each of the obtained signal levels are scaled by a processor such as the processor 1302 to obtain an overall camera image. The scaling performed by the processor accounts for any differences the effects of the selected exposure settings. The result is an image having higher dynamic range than would otherwise be possible. The resulting image captures with relatively high fidelity reflections whether relatively weak or relatively strong. The result is greater accuracy in determining 3D coordinates for objects having a combination of low-reflectance regions and high-reflectance regions.

The second camera 1420 includes a camera lens 1421 and a camera integrated circuit 1422. In an embodiment, a ray 1437 travels from the object point 1336 on the object surface 1335 through the camera perspective center 1438 to strike the camera integrated circuit 1422 at a point 1439. The camera integrated circuit 1422 includes a camera photosensitive array of pixels 1430 and chip-level electronics 1431. Each pixel 1430 includes an optical detector 1423 and an electrical support element 1424 having a plurality of memory elements, including a first memory element 1426 through an $n^{th}$ memory element 1427. In an embodiment, each plurality of pixels within the electrical support element 1424 is connected to the chip-level electronics 1431, which communicates with a processor 1302 located off the integrated circuit 1422. In an embodiment, the electrical support element 1424 further includes a function to reset the memory elements in the electrical support unit 1424. In an embodiment, chip level electronics 1331 and chip level electronics 1441 communicate through a communications channel 1444. Such a channel may be used, for example, to establish synchronization among captured images. In embodiments, the processor 1302 communicates with integrated circuit 1322 through chip-level electronics 1331 or electrical support element 1324. In embodiments, the processor 1302 communicates with integrated circuit 1422 through chip-level electronics 1431 or electrical support element 1424.

In an embodiment, the memory elements from 1 to n receive exposure settings 1425 that differ for the n memory elements in the pixel 1430. The different signals generated by the optical detector 1423 in response to the different exposure settings 1425 results in the memory elements 1-n having different stored values. In other words, it is possible to obtain increased dynamic range by using multiple exposure settings from relatively short exposures to relatively long exposures.

The result of multiple exposure settings is a collection of different light levels recorded by the n memories in the pixel 1430. In an embodiment, the stored memory value is selected that, among the n memories, has the largest signal level below the saturation region of the pixel. Each of the obtained signal levels are scaled by a processor such as the processor 1302 to obtain an overall camera image. The scaling performed by the processor accounts for any differences the effects of the selected exposure settings. The result is an image having higher dynamic range than would otherwise be possible. The resulting image captures with relatively high fidelity reflections whether relatively weak or relatively strong. The result is greater accuracy in determining 3D coordinates for objects having a combination of low-reflectance regions and high-reflectance regions.

In an embodiment, the processor 1302, which may be any processor coupled to the stereo cameras 1400, establishes a correspondence of the object point 1336 as seen in the first camera 1320 and the second camera 1420. The object point may correspond to a natural feature of the object 1335. For example, the object point could correspond to an intersection of three edges or the center of a hole. The object point may also correspond to a target intentionally placed on the object. For example, the target might be a reflective photogrammetry dot. In an embodiment, the point 1336 is recognized by the processor 1302 as having the same image points 1339, 1439 on the first camera 1320 and the second camera 1420, respectively, based on matching methods known in the art. Such image points 1339, 1349 recognized as being the same based on the images captured by each of the cameras 1320, 1420 are sometimes referred to as interest points. An example of a method used to identify corresponding interest points in a plurality of images is the scale-invariant feature transform (SIFT), U.S. Pat. No. 6,711,293 to Lowe, the contents of which are incorporated by reference herein. Many other methods are available for determining interest points. Ordinarily, an interest point is defined as a point having a well-founded definition, a well-defined position in space, an image structure that is rich in local information content in a region surrounding the interest point, and a variation in illumination level that is relatively stable over time. Other common feature detection methods for finding cardinal points 3610 include edge detection, blob detection, and ridge detection. An important aspect of interest points is that they remain fixed in space when they are viewed by a 2D camera from different positions and orientation (that is, from different poses). Because of this property of interest points such as the point 1336, interest points may be used to register together multiple collected 3D images, for example, multiple 3D images obtained by capturing multiple 2D images with the cameras 1320, 1420.

Once correspondence has been established between the 2D images of the cameras 1320, 1420 for the point 1336, a mathematical triangulation method may be used to determine the 3D coordinates of the point 1336 in the frame of reference of the stereo camera 1400. This triangulation method was described herein above in reference to FIGS. 2, 4. In an embodiment, the stereo camera system 1400 is extended to a multi-view camera system by adding one or more additional cameras to the cameras 1320, 1420. In this case, additional views of the object are made available, and additional triangulation calculations may be performed, thereby conferring some redundancy to the measurements. In an embodiment, this redundancy is used to identify the presence of measurement errors.

An alternative to the apparatus and method described with respect to FIG. 14A would be to store detected light levels in external memory following measurement by the photosensitive arrays of the first camera 1320 and the second camera 1420. However, such a method uses a relatively long time for electrical pixel values to be transferred into an external memory. In most cases, such transfer occurs relatively slowly over a serial bus. An advantage of the apparatus 1400 and corresponding method described herein above is in being able to move through a large number of projected levels or exposure settings very quickly since the measured values are saved internally for each pixel, thereby eliminated the need for serial transfer out of the photosensitive arrays.

Figure 14B:
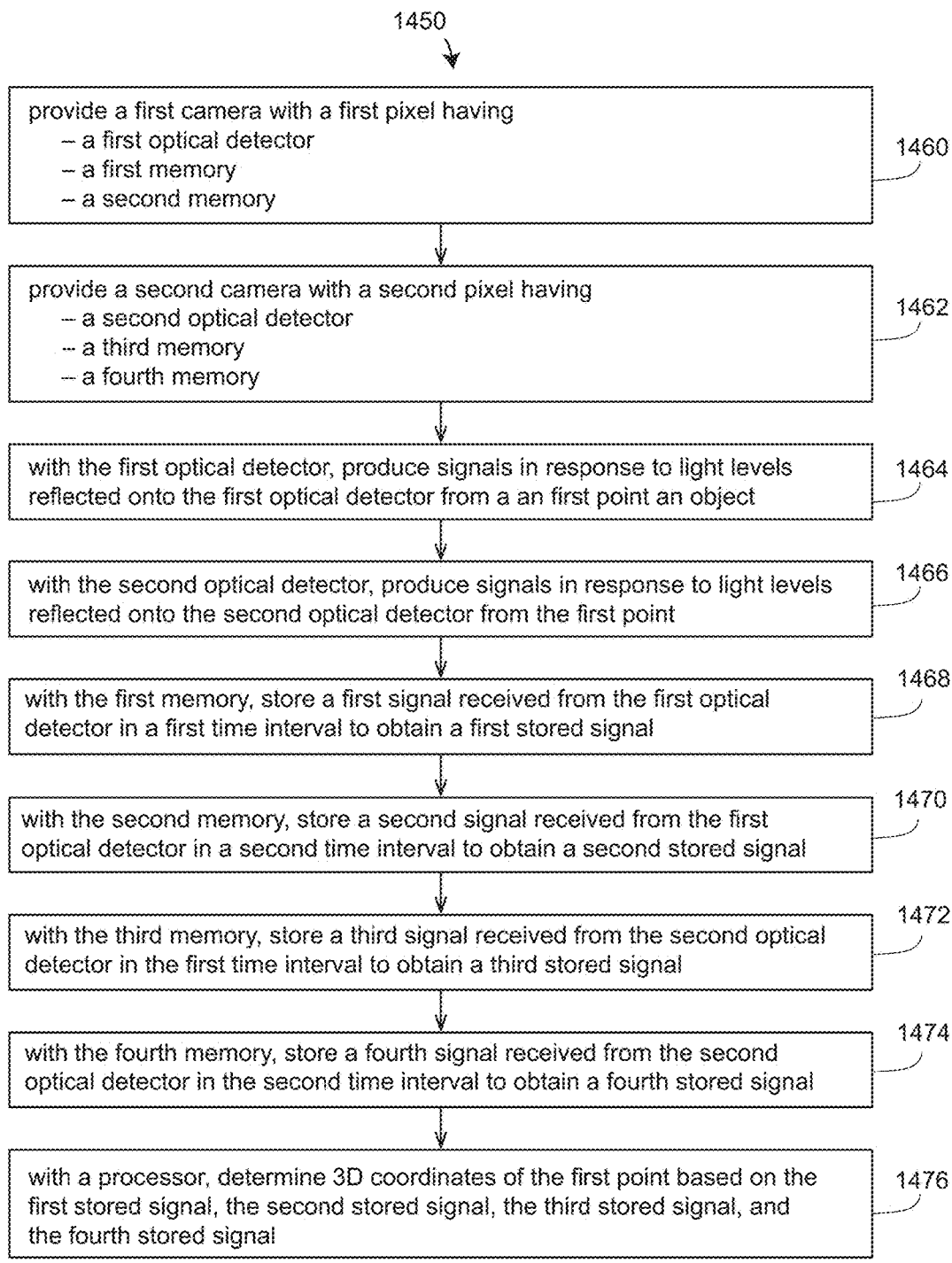
FIG. 14B is a flow chart showing elements of a method for improving dynamic range in a stereo camera according to an embodiment of the present invention.

A method 1450 for determining 3D coordinates is illustrated in FIG. 14B. In an element 1460 of a method 1450, there is provided a first camera with a first pixel having an optical detector, a first memory, and a second memory. In an element 1462, there is provided a second camera with a second pixel having a second optical detector, a third memory, and a fourth memory. In an element 1464, a first optical detector produces signals in response to light levels reflected onto the first optical detector from a first point on an object. In an element 1466, a second optical detector produces signals in response to light levels reflected onto the second optical detector from the first point. In an element 1468, the first memory stores a first signal received from the first optical detector in a first time interval to obtain a first stored signal. In an element 1470, the second memory stores a second signal received from the first optical detector in a second time interval to obtain a second stored signal. In an element 1472, the third memory stores a third signal received from the second optical detector in the first time interval to obtain a third stored signal. In an element 1474, the fourth memory stores a fourth signal received from the second optical detector in the second time interval to obtain a fourth stored signal. In an element 1476, a processor determines 3D coordinates of the first point based on the first stored signal, the second stored signal, the third stored signal, and the fourth stored signal.

Figure 15:
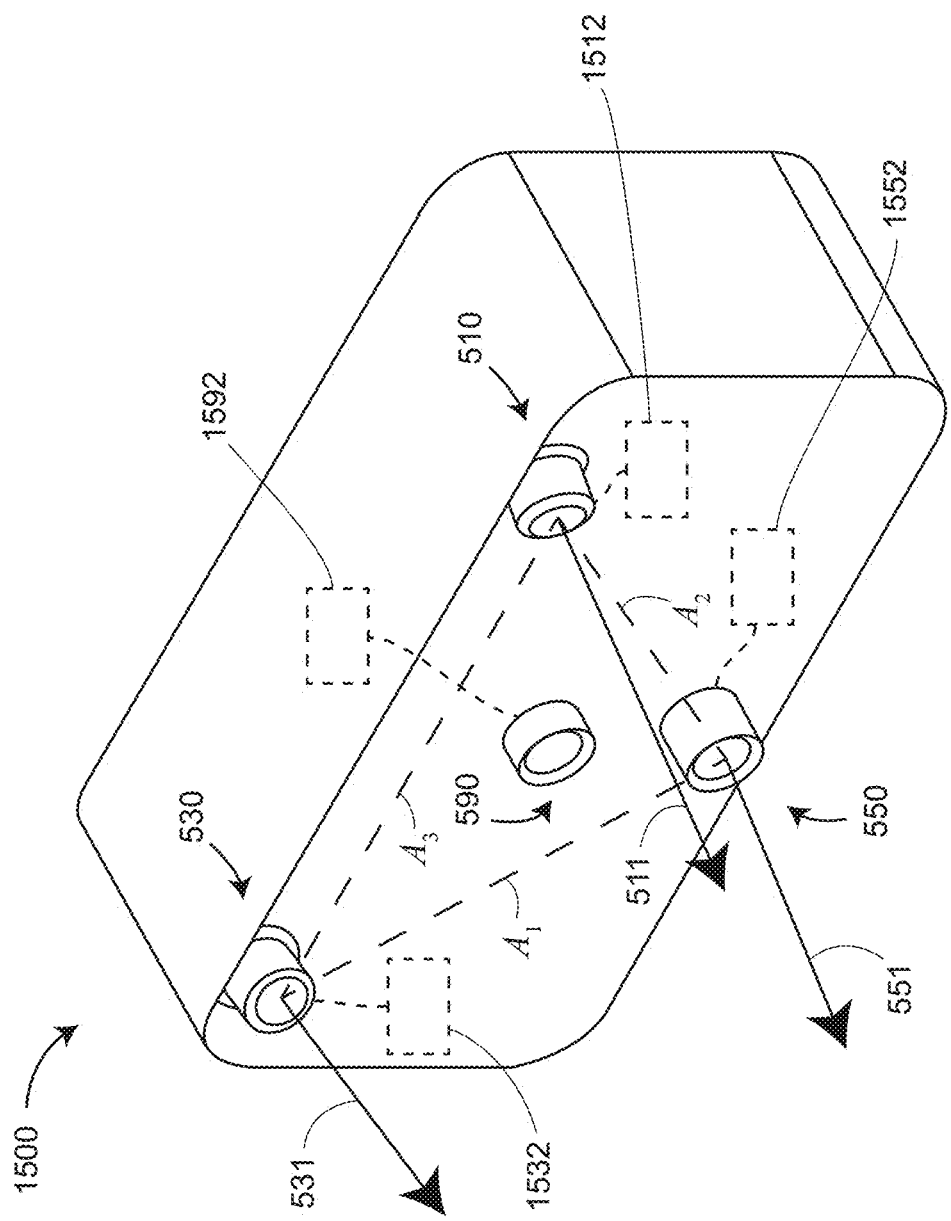
FIG. 15 is an isometric view of a triangulation scanner according to an embodiment of the present invention.

A 3D measuring device may combine a triangulation scanner and a camera used to register multiple 3D images. An example of such a 3D measuring device is the scanner 500 in FIG. 5 and the scanner 1500 in FIG. 15. In FIG. 15, the scanner 1500 includes a projector 550 and cameras 510, 530 used to determine 3D coordinates based on a triangulation method and a camera 590 used to register multiple 3D images (3D point clouds) and colorize the points in the 3D images. In an embodiment, the camera devices 510, 530, 590 each have photosensitive arrays with pixels that include a memory function and may further include an accumulator function. For example, in an embodiment, each of the cameras 1510, 1530 include pixels 1512, 1532 with accumulators that operate synchronously with a projected pattern of light and no projected light as described with reference to FIGS. 9A, 9B, 9C, 9D, 10, 11, 12. With this apparatus and method, the unwanted effects of bright background light are minimized. In another embodiment, the cameras 510, 530, 590 are operable to increase the dynamic range of captured 2D images by changing exposure times and saving the detected signals in memories of pixels 1512, 1532, 1592 (FIG. 15), as described in relation to FIGS. 13A, 13C. In another embodiment, the projector 550 and the cameras 510, 530 are operable to vary the projected light levels of a projected with electronics 1552 while responding synchronously with optical detectors and memories in optical detectors 1512, 1532, as described in relation to FIGS. 13A, 13B.

In another embodiment, the ON/OFF apparatus and methods described in relation to FIGS. 9A, 9B, 9C, 9D, 10, 11, 12 are combined with the increased dynamic range apparatus and methods of FIGS. 13A, 13B, 13C. In an embodiment, the projected pattern is turned on and off multiple times during each of the changes in exposure time or projected light level to increase dynamic range, and the results of the changes captured in the memories 1-n of the pixel 1330 in FIG. 13A. In another embodiment, the exposure times or projected light levels are changed multiple times during each ON part of the ON-OFF cycles of the projector.

Difficulties sometimes faced by triangulation scanners include: (1) loss of accuracy as a result of high levels of background light such as sunlight; (2) errors in determining correspondence among projected and imaged spots resulting in outliers in measured 3D coordinates; (3) registration imperfections in aligning determined 3D coordinates and a background image obtained with a second camera; (4) errors in registering structured light illumination from the triangulation scanner and illuminated spots from an external projector; (5) distinguishing among illuminated patterns projected onto an object from two different on-board triangulation-scanner projectors; and (6) viewing objects partially obscured by foreground obstructions.

Figure 16:
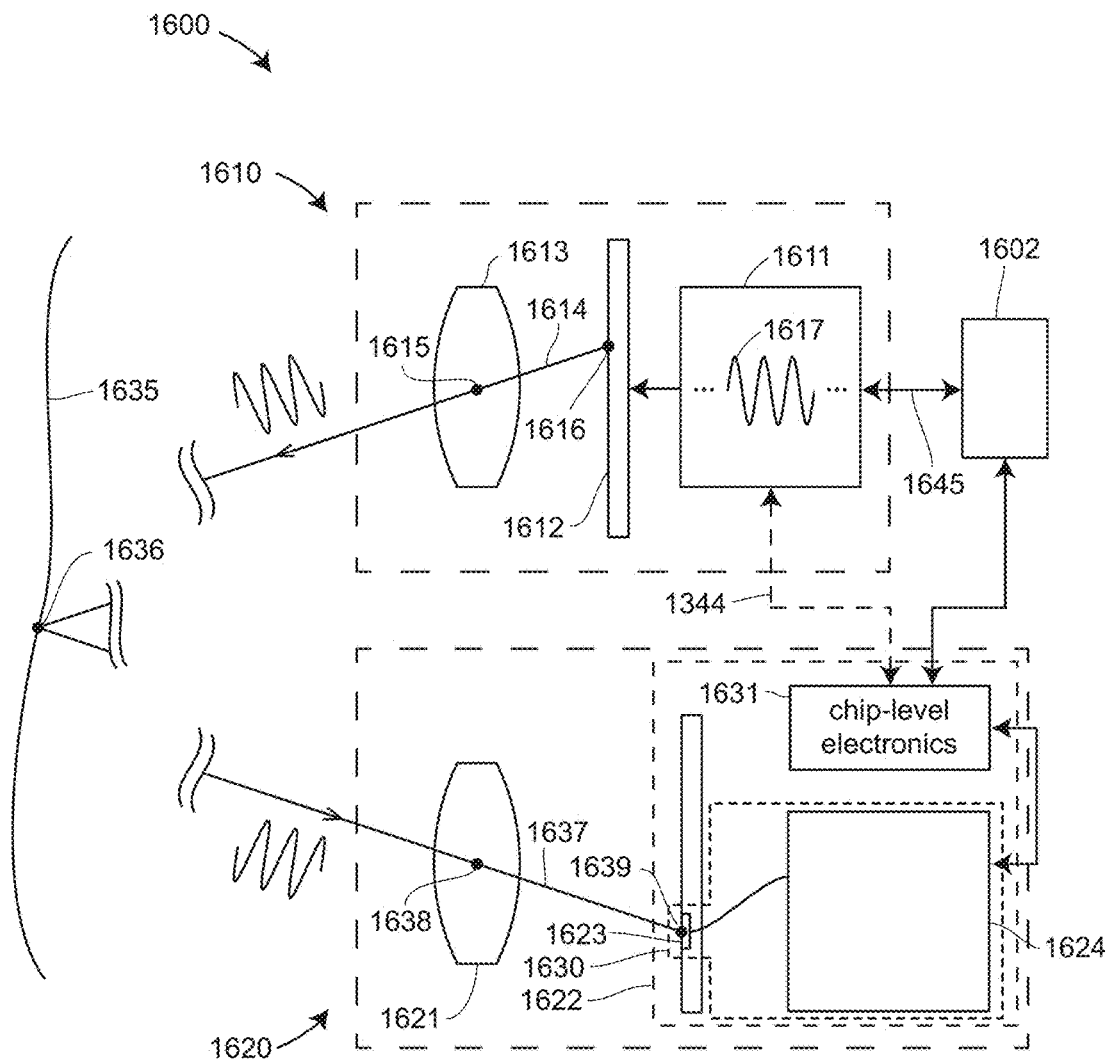
FIG. 16 is a block diagram showing a triangulation scanner system that makes use of a time-of-flight (TOF) array according to an embodiment of the present invention.

An approach that may be used to overcome these difficulties is to combine a time-of-flight (TOF) imaging array with triangulation scanner capability. FIG. 16 illustrates a 3D scanner 1600 that includes a projector 1610 and a camera 1620. The projector 1610 includes a projector source 1611 that produces a pattern emitted from a surface 1612 or, equivalently, emitted along a line 1614. In an embodiment, in addition to having a spatial pattern over the surface 1612 or equivalently over the projected pattern of rays 1614, the pattern also includes a temporal modulation 1617. In another embodiment, the spatial pattern is sometimes turned on and other times turned off, with the temporal pattern left on continually. In another embodiment, the spatial pattern and temporal pattern are turned on at different times. In FIG. 16, the temporal modulation 1617 is a sinusoidal modulation, but in other embodiments other types of temporal modulation are possible. For example, in an embodiment, the temporal modulation is square wave modulation such as simple on-off modulation. In another embodiment, the temporal modulation is a pulsed modulation having relatively short pulses separated by relatively long time intervals. In an embodiment, the spatial pattern over the surface 1612 is created by a pattern generator within the projector source 1611. In another embodiment, the pattern is created by a glass slide within the projector source 1611. In another embodiment, the pattern is created by a digital micromirror device (DMD) within the projector source 1611. The DMD projects light off small micromirror segments to create the desired pattern. In another embodiment, the pattern is created by a liquid crystal on silicon (LCoS) array within the projector source 1611. In another embodiment, the pattern is created by a diffractive optical element (DOE) within the projector source 1611. In other embodiments, the pattern is created by other types of elements within the projector source 1611. In an embodiment, the projector 1610 communicates with a processor 1602 through communication channel 1645.

In an embodiment, the projector source 1611 projects the pattern of light through the projector lens 1613. In an embodiment, each ray of light 1614 is projected through a perspective center 1615 of the projector lens. Here it is understood that each modeled ray of light 1614 is corrected for aberrations such as the aberrations of the projector lens 1613. The ray of light 1614 is projected from a point 1616 on the surface 1612 to a point 1636 on the object surface 1635. In another embodiment, the projector 1610 is used without the lens 1613. An example of such a projector is one that launches light from the light source 1611 through a DOE, with the resulting solid angle of the projected light being small enough to eliminate the need for the lens 1613.

In this case, the perspective center 1615 is associated with the position of the DOE rather than the position of the lens 1613.

The camera 1620 includes a camera lens 1621 and a camera integrated circuit 1622. In an embodiment, a ray 1637 travels from the object point 1636 through the camera perspective center 1638 to strike the camera integrated circuit 1622 at a point 1639. The camera integrated circuit 1622 includes chip-level electronics 1631 and a camera photosensitive array of pixels. Each pixel 1630 includes an optical detector 1623 and processing circuitry 1624. The camera integrated circuit is also referred to as a time-of-flight (TOF) imaging array because it obtains an image having a distance associated with each pixel, the distance being determined based on a time-of-flight to a point on an object. The term TOF refers to any method that determines distance to a point based on a round-trip time for light to travel from a projector point to an object point and back to the camera. In other words, the TOF is based in part on the speed of the light in the air through which the light travels.

The projector 1610 projects an optical pattern from the surface 1612 or, equivalently, along the pattern of rays 1614 that emerge from the projector perspective center 1615. In an embodiment, the projected optical pattern is temporally modulated, for example, by a sinusoidal modulation, square wave modulation, pulsed modulation, or other type of modulation.

Figure 17A:
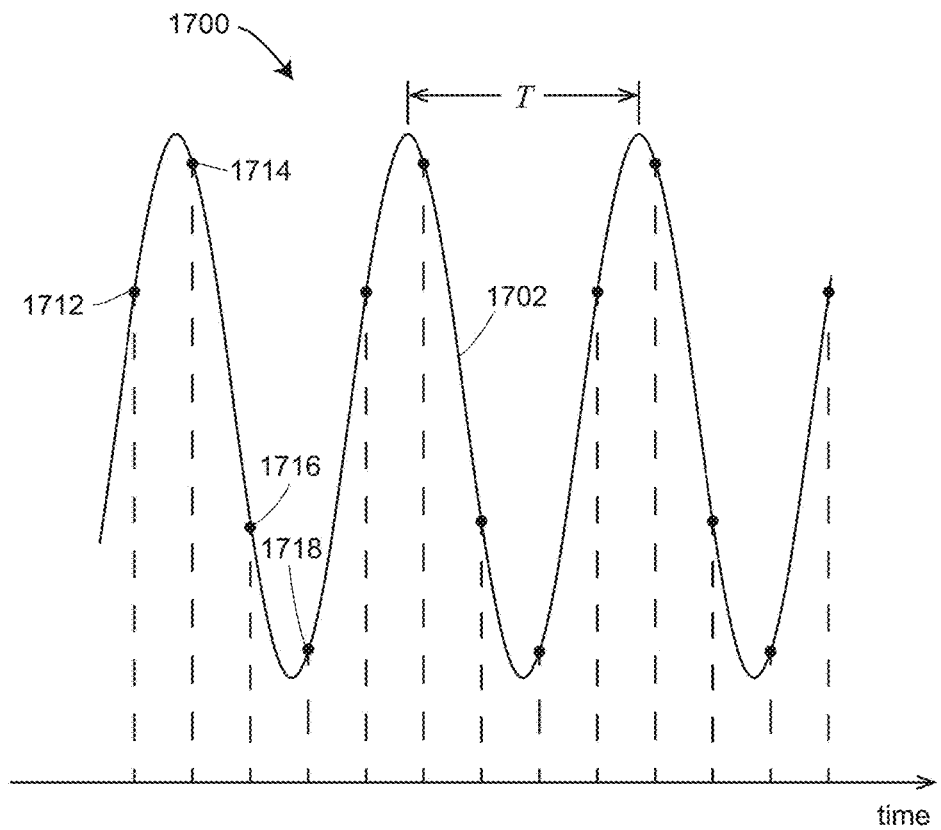
FIGS. 17A, 17B, 17C, 17D, 17E, 17F are detected modulation waveforms and corresponding sampling signals of a sinusoidally modulated time-of-flight (TOF) system according to embodiments of the present invention.
Figure 17B:
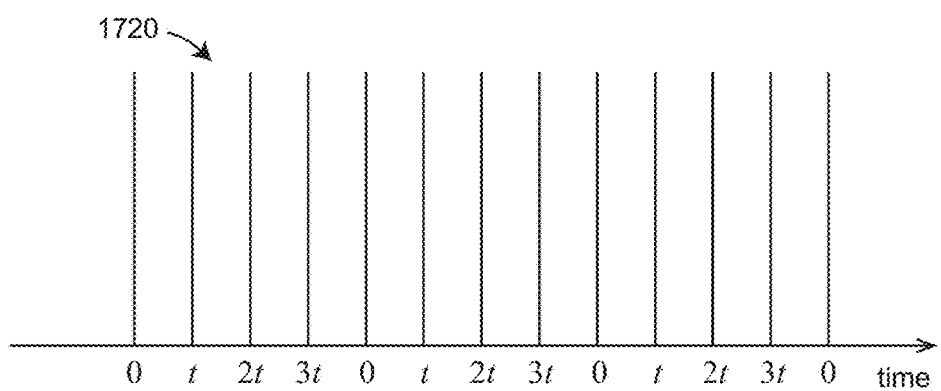

FIGS. 17A, 17B, 17C, 17D, 17E, 17F, 17G illustrate a method of extracting information on distance to an object point and also in determining amplitude and offset of imaged light. FIG. 17A shows an example of temporal modulation 1700 with a sine wave 1702. In an embodiment, samples of the sine wave 1702 are taken by a sampling clock 1720 at clock intervals t. In an embodiment, the clock intervals are one quarter of the sine-wave period T. The sampling points 1712, 1714, 1716, 1718 repeat in each cycle of the sine wave. In an embodiment, such fast sampling may be obtained, for example, with an analog-to-digital converter (ADC). An example of such an approach, including a general formulation for determining distance based on an arbitrarily large number of samples per cycle is given in U.S. Pat. No. 7,352,446, the contents of which are incorporated by reference.

Figure 17C:
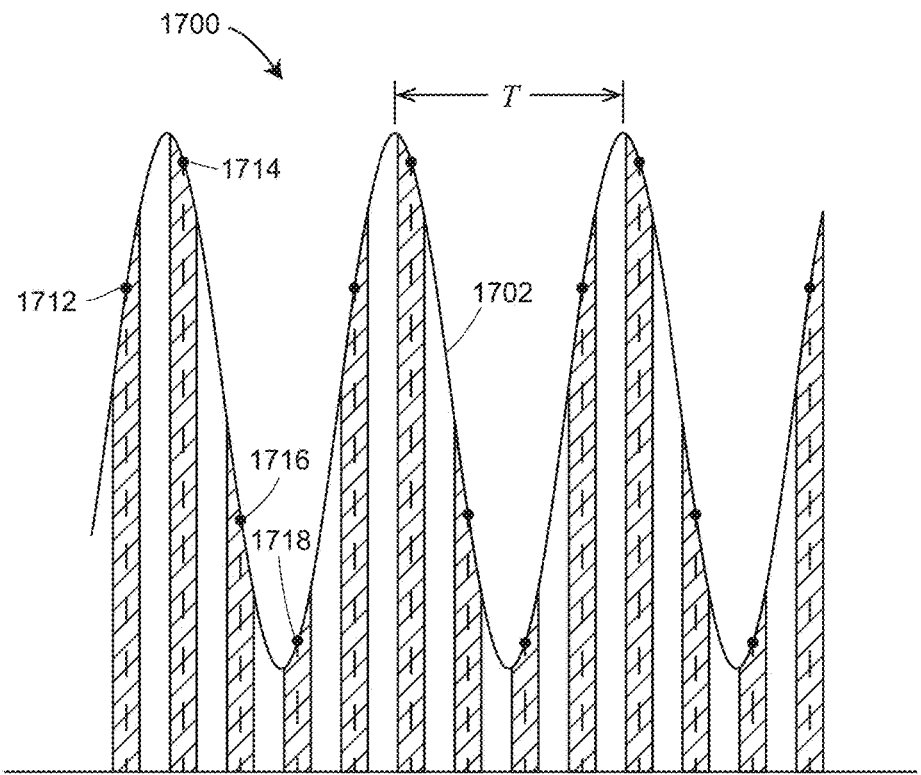
Figure 17D:
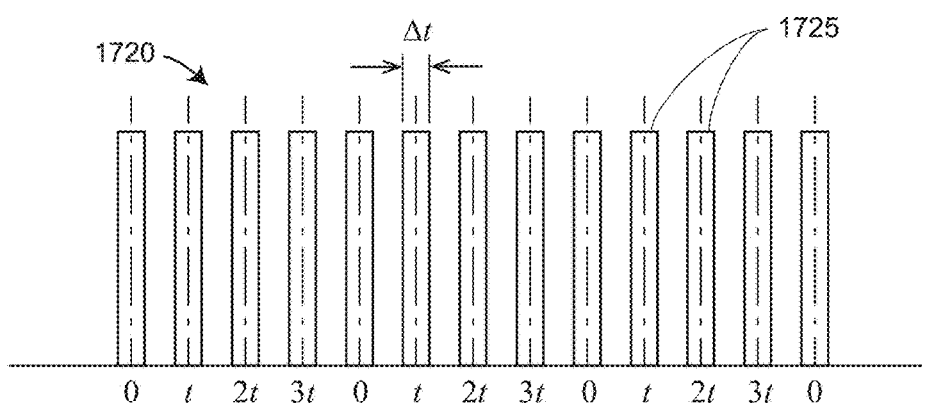

FIGS. 17C, 17D illustrate a case in which sampling takes place over intervals 1725 of width $\Delta t$ rather than at points such as 1712, 1714, 1716, 1718 on the modulated waveform 1702. The time interval $\Delta t$ is referred to as the integration time. A method for finding the phase of sine wave 1702 relative to the sampling clock is now described. Each of the integration times around each of the sampling points is summed over some integer number of periods N. For example, suppose that N is 16. Then each of the integration regions around the point 1712 is summed for each of 16 consecutive cycles of the sine wave. This summing may result in an analog value if an analog component such as a capacitor is used in the summing process. Alternatively, the summing process may use digital components such as comparators, counters, or ADCs. In either case, the hatched areas under the sine wave are summed for the N consecutive areas about each of the points 1712, 1714, 1716, and 1718. These summed values are used in a formula, described below, to determine the phase of the sine wave relative to the sampling clock. This phase in turn is used to determine a distance traveled by light from a projector point 1616 to a camera point 1639. This in turn is used to determine a distance from the 3D measuring device 1600 to the object point 1636, as explained further herein below.

Figure 17E:
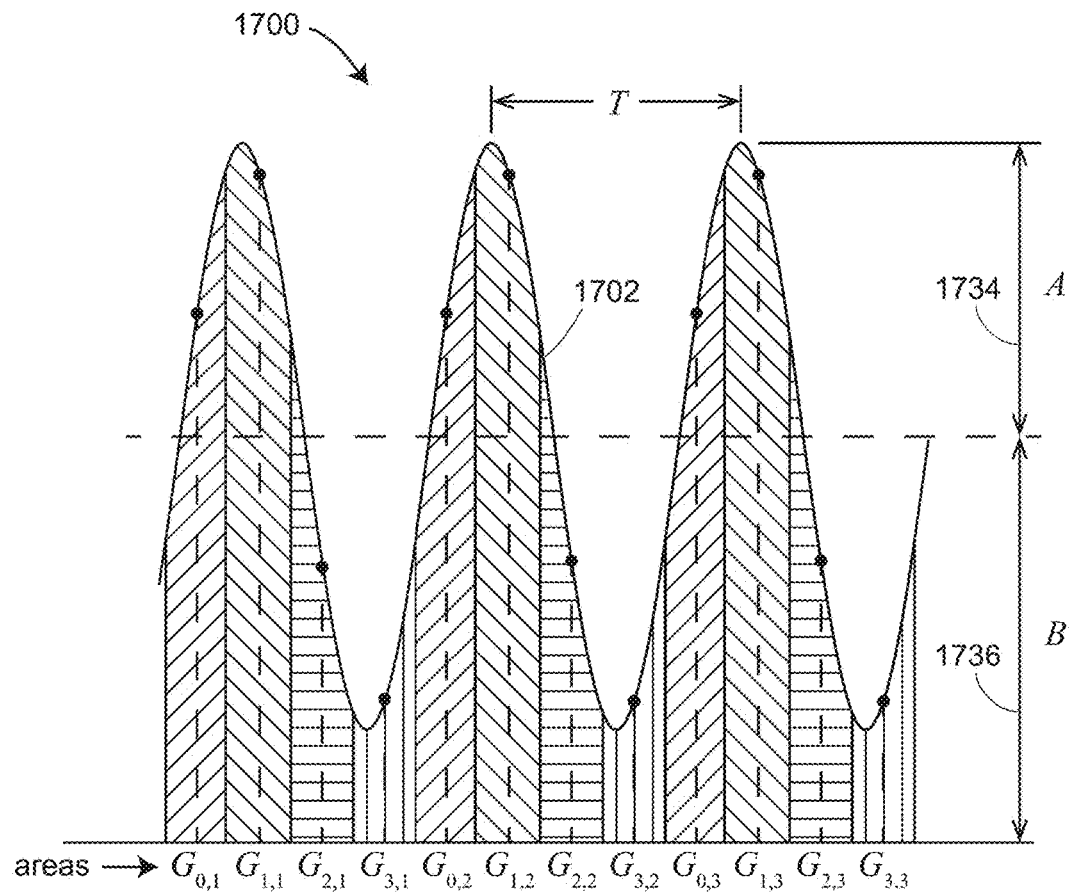
Figure 17F:
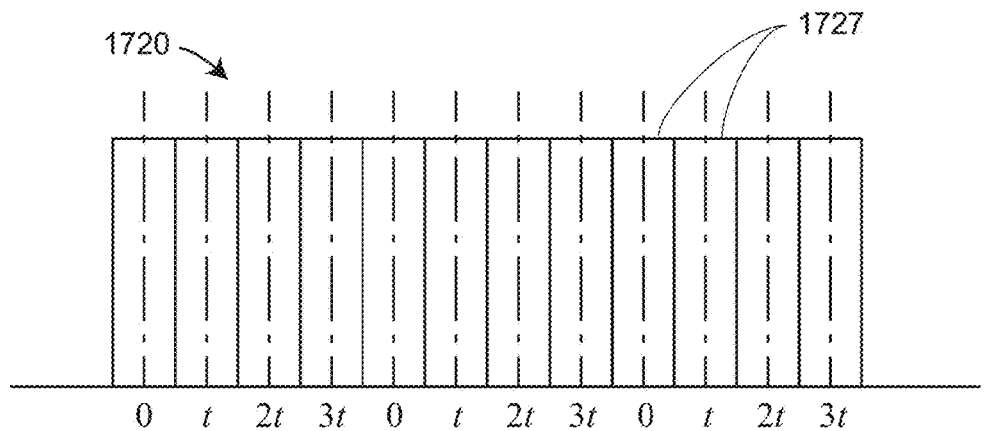

FIGS. 17E, 17F show sampling taking place over intervals 1727 with each integration time $\Delta t$ equal to one quarter the period T of the sine wave 1702. The accumulations taken over a large number of periods N, the error caused integrating over a finite time $\Delta t$ becomes vanishingly small. For division into four integration periods as illustrated in FIG. 17E, the error becomes exactly zero for integrations taken over multiples of four cycles of the sine wave. In FIG. 17E, light received by the optical detector 1623 is separated into the four integration periods and labeled with a cycle index number i as $G_{0,i}$, $G_{1,i}$, $G_{2,i}$, $G_{3,i}$. The quantity $C_0$ is found by summing $G_{0,i}$ from 1 to N, and the quantities These G values are summed over the index i from 0 to N to obtain the quantities $C_1$, $C_2$, $C_3$ are found in the same manner. It can be shown that integration of each sine-wave cycle in four parts, as illustrated in FIG. 17E, the phase p of the sine wave, relative to a sample clock, can be found using the formula p=arctan $((C_3-C_1)/(C_0-C_2))$. To within a constant value, the distance d from the projector perspective center 1615 to the camera perspective center 1638 is proportional to the phase and, to within an offset value, is equal to d=cp/(4$\pi$ f), where c is the speed of light of air and f=1/T is the modulation frequency of the sine wave 1702. Suppose for example that the frequency is f=100 MHz. The distance corresponding to one complete round-trip cycle (i.e., a 2$\pi$phase shift) of the sine wave from the projector to the camera is then d=3*$10^8$*2$\pi$/(4$\pi$*$10^8$) meter=1.5 meter. The accuracy of the measured distance will then depend on the accuracy of the calculated phase p from the formula given earlier in this paragraph. The formulas in this paragraph are given in equations (2) and (3) of "CMOS SPAD pixels for indirect time-of-flight ranging," Photonics Conference (IPC), 2012 IEEE by D. Bronzi, et al., the contents of which are incorporated by reference. The amplitude A and the offset B of the sinusoidal modulation are indicated in FIG. 17E by the reference numbers 1734, 1736, respectively. The amplitude A is given by A=$((C_3-C_1)^2+(C_0-C_2)^2)^{1/2}$/(2 N $\Delta t$ sinc($\pi$f $\Delta t$)), where the sinc function is defined by sinc(x)=sin($\pi$x)/($\pi$x). The offset B is given by B=$(C_0+C_1+C_2+C_3)$/(4 N $\Delta t$).

Figure 17G:
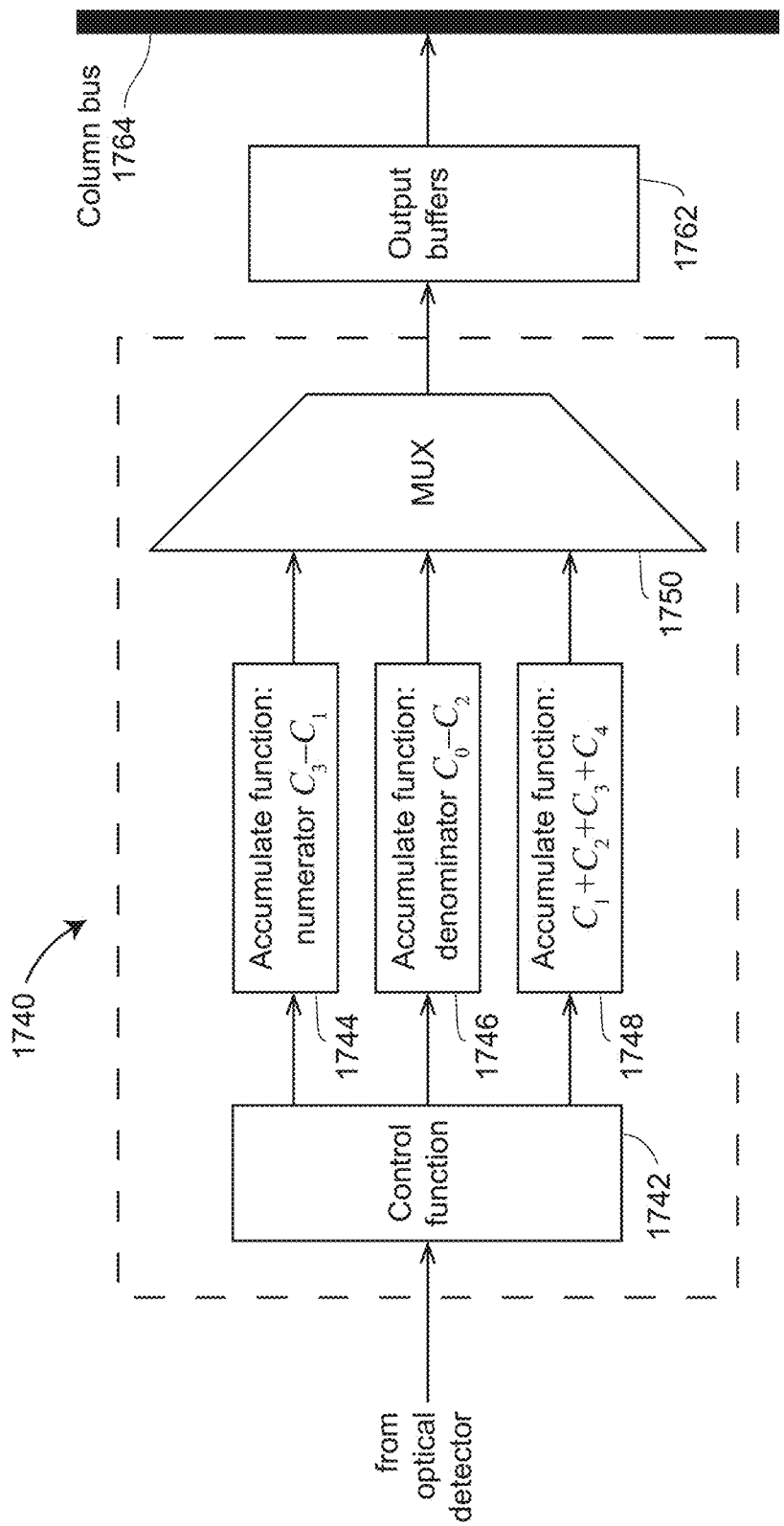
FIG. 17G is a block diagram of electrical functions performed in processing sinusoidally modulated signals according to an embodiment of the present invention.

FIG. 17G shows a possible implementation of electrical circuitry 1740 within the pixel 1630. In an embodiment, a control circuit function 1742 directs signals to the accumulate function 1744 to accumulate the difference in the $G_{3,i}$ and $G_{1,i}$ values over the N cycles to obtain the numerator value $C_3-C_1$. The control circuit function 1742 likewise directs signals to the accumulate function 1746 to obtain the denominator value $C_0-C_2$ and to the accumulate function 1748 to obtain the sum $C_0+C_1+C_2+C_3$. In an embodiment, the accumulated signal levels from 1744, 1746, 1748 are fed through a multiplexer (MUX) 1750 to an output buffer, which stores signals for delivery to a column bus 1764. Signals from the column bus may be processed by a processor such as an microprocessor or field-programmable gate array (FPGA) to determine distance to the object. In the elements of FIG. 17G, signals may be analog or digital at any position in the system. In some embodiments, signals remain analog within the electrical circuitry 1740 of the pixel, with conversion to digital values occurring outside the pixel, for example, at the column or chip level. In other embodiments, signals are converted to digital values early on within the pixel, for example, by using comparators, counters, and ADCs. There are many ways to implement distance measurement, whether using a phase-shift method or another method. It should be appreciated that the electrical circuitry 1740 in FIG. 17G is an example of one of many ways to implement the inventive ideas described herein.

An important aspect of the determination of distance based on phase shift of sinusoidal modulation is that unwanted background light automatically cancels in the calculated phase. Background light cancels in both the numerator and denominator in the formula for phase, $p=\arctan((C_3-C_1)/(C_0-C_2))$. Background light also cancels in the calculated amplitude A of the imaged object, $A=((C_3-C_1)^2+(C_0-C_2)^2)^{1/2}/(2 N \Delta t \operatorname{sinc}(\pi f \Delta t))$. The amplitude may be displayed to form a grayscale representation of the imaged object, with the unwanted glare of background light. Furthermore, because the light is accumulated over N cycles, potential problems from saturation of the optical detector 1623 are reduced.

As stated herein above, the projector 1610 is operable to produce both temporal modulation of the projected light and spatial modulation of a pattern of projected light. In some embodiments, temporal and spatial modulations are provided separately. In other embodiments, temporal and spatial modulations are provided combined.

Consider first the case in which modulations are provided in combination. In an embodiment, the temporal and spatial modulations are superimposed. Consider for example the case in which a spatial pattern is produced by sending laser light through a diffractive optical element (DOE) in the projector 1610. In an embodiment, the DOE is configured to produce a pattern of spots that move away from the projector 1610 in an angularly expanding pattern. In other words, the pattern of projected spots projects outward over a fixed solid angle. In an embodiment, the temporal modulation 1617 is superimposed on each projected spot. For the case in which the modulation is sinusoidal modulation, the light level of each spot reflected off the object will vary sinusoidally in time. Hence the photosensitive array of the integrated circuit 1622 will receive a collection of bright spots surrounded by whatever background light is reflected by the object or its surroundings. If the object is measured in a dark environment, the background light will be relatively dark compared to background light from a bright sunlit environment. In this case, because of the subtraction of background light that occurs with sinusoidal modulation using the methods described herein above, we would expect the unwanted effects of background light to be minimized for those areas of the object intersected by the spots. These 3D coordinates could be determined using distances determined using the calculated phase—for example, the formulas $d=cp/(4\pi f)$ and $p=\arctan((C_3-C_1)/(C_0-C_2))$. In addition, the 3D coordinates could be determined using triangulation calculations with the image captured by the camera 1620 based on the amplitude A calculated using the formula $A=((C_3-C_1)^2+(C_0-C_2)^2)^{1/2}/(2 N \Delta t \operatorname{sinc}(\pi f \Delta t))$ or a similar formula according to the particular type of temporal modulation 1617.

An advantage of using the value A in the image is that the background noise has been removed, thereby increasing the accuracy of the 3D coordinates in the triangulation calculation. One potential advantage in determining 3D coordinates based both on a direct calculation of distance by the integrated circuit 1622 (for example, by using the formula $p=\arctan((C_3-C_1)/(C_0-C_2))$) and on a triangulation calculation using a spatial pattern having background noise removed (for example, by using the formula $A=((C_3-C_1)^2+(C_0-C_2)^2)^{1/2}/(2 N \Delta t \operatorname{sinc}(\pi f \Delta t)))$ is that the distance measurement can be used to assist in determining a correspondence between points in the projected pattern (for example, as seen on the surface 1612) and points on the 2D image captured by the camera integrated circuit 1622. For example, a projected pattern might be a collection of spots generated by laser light passing through a DOE. The collection of spots may be arranged in a rectangular grid with each spot having nearly identical appearance. In this case, the correspondence cannot be determined based solely on the appearance of elements in the projected and imaged patterns. A way around this dilemma is to use two cameras in a triangulation system according to the apparatus and methods described herein above in regard to FIGS. 5, 6A, 6B, 8A, 8B, 8C. However, as the spacing between projected spots in such a pattern get closer together, the ability to obtain correspondence among projected and imaged spots becomes more difficult. In this case, having an estimated distance to each object point 1636 provides additional information to further determine and confirm the correspondence among projected and imaged spots. This same advantage applies to determining correspondence among projected and imaged points in all types of patterns, not only spots produced by a DOE.

In another embodiment, temporal and spatial modulations are provided separately. This approach does not determine 3D coordinates as quickly as when temporal and spatial modulations are combined, but it has potential advantages. In an embodiment, each pixel 1630 in the photosensitive array of the integrated circuit 1622 determines a distance to the object. This enables the processing circuitry 1624 of the pixels in the camera 1620 to detect distances to the objects at points for which 3D coordinates were not determined by the triangulation calculation of a 3D measuring system 1600. For example, again consider the case of a projector 1610 that sends laser light through a DOE to project an array of uncoded spots of light. A triangulation calculation determines the 3D coordinates of such spots, but such 3D coordinates are not determined for every pixel. On the other hand, the distances provided by the processing circuitry 1624 for each pixel enables the system to identify many features such as the edges of objects. This enhances the ability of the system 1600 to determine the correspondence among projected and imaged points.

A scanner geometry for which a 3D camera is useful, even when not used to image a projected pattern, is shown in FIGS. 5, 6A, 6B, 8C. The cameras 590 in FIGS. 5, 6B and the camera 860 in FIG. 8C are used to capture an image used at least partly for registration of multiple successive frames of 3D images obtained based at least in part on triangulation calculations performed by cameras 510, 530 and projector 550 in FIGS. 5, 6B and cameras 830, 840 and projector 820 in FIG. 8C. One way that the images of the cameras 590, 860 can be used to help determine registration is by using visual matching methods in successive frames as described herein above in reference to FIGS. 7A, 7B. By making the cameras 590, 860 ranging cameras that determine distances based on a calculated time-of-flight that depends on the speed of light in air, depth values for each of the points on the images 7A, 7B, may further contribute to accurate registration of multiple determined 3D images. Another potential purpose for the cameras 590, 860 is to provide the color information needed to colorize the registered 3D images by using photosensitive arrays that provide both depth and color information.

Some 3D sensor chips have the ability to determine red, green, and blue (RGB) colors as well as depth (D) values, which is why such chips are commonly referred to as RGB-D chips. By obtaining color information for each pixel, the entire scene may be colorized as well as provided with 3D coordinates. In the case of the cameras 590, 860, the 3D information provided by the cameras may be used to assist in registration of the 3D coordinates mainly obtained from a triangulation calculation, while the RGB color information may be used to colorize the registered 3D image.

In another embodiment, the triangulation scanner 1600 in FIG. 16 includes a camera 1620 having RGB-D pixels 1630 that provide color as well as depth information. Such pixels enable colorizing of determined 3D images. The determined 3D images may be based on the spatial and temporal modulations being projected combined or separately.

Figure 18:
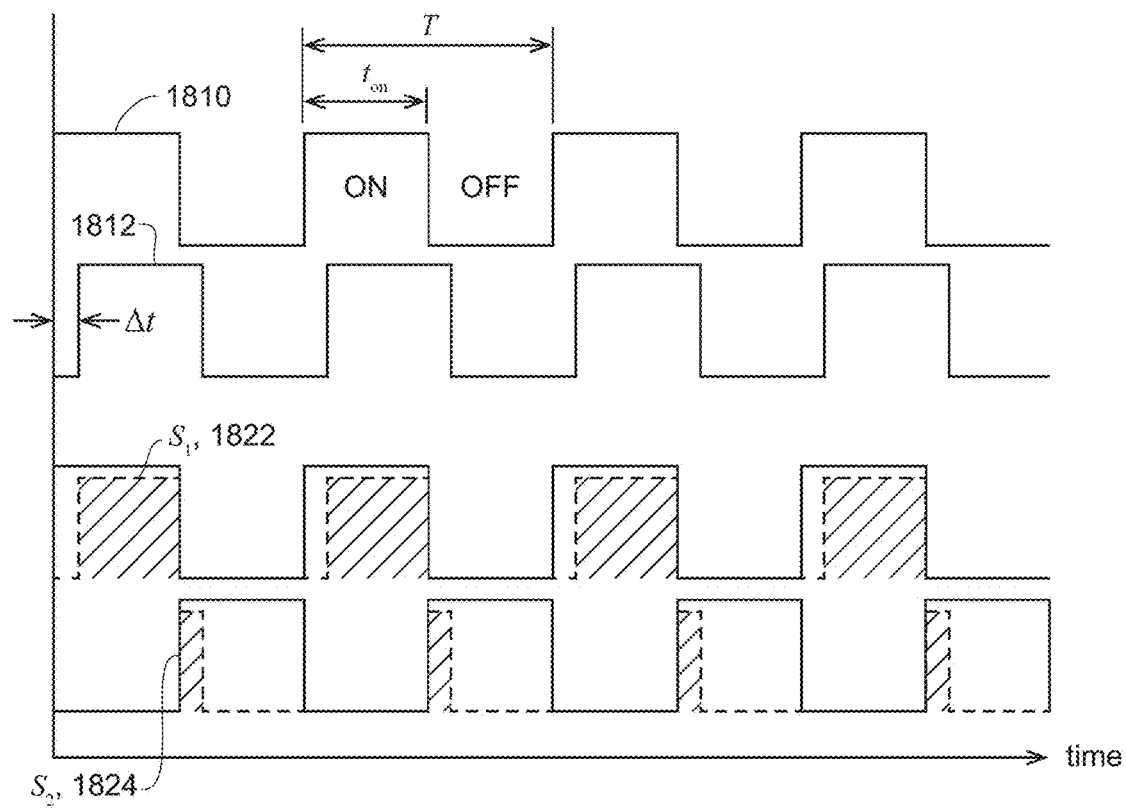
FIG. 18 is a graph illustrating processing of a waveform having square-wave modulation according to an embodiment of the present invention.

Many types of temporal modulation 1617 may be applied to the light projected from the projector 1610. In an embodiment illustrated in FIG. 18, the modulation 1810 is square-wave modulation having a cycle period T, with the applied modulation in an ON state half the time and an OFF state half the time. In an embodiment, temporally modulated light 1617 having the temporal waveform 1810 emerges from the projector perspective center 1615 and travels to an object point 1636. The ray of 1637 passes through the camera perspective center 1638 and arrives at a point 1639 on a pixel 1623 of an integrated circuit 1622, also referred to as the 3D imaging array 1622. The reflected waveform 1812 is shifted in time by a time Δt relative to the launched waveform 1810. In response to the received light, the pixel 1623 generates signals processed by the processing circuitry 1624. In an embodiment, the processing circuitry 1624 includes elements of the electrical support element 924 of FIG. 9A, namely a first accumulator 925, a second accumulator 926, and an optional arithmetic unit 927. In an embodiment, accumulators 925, 926 are clocked by a switch element 956 to enable the received electrical signal to accumulate for an integer N cycles. During the ON portion of each cycle, the first accumulator 925 receives a signal level $S_1$, indicated by the reference number 1822. During the OFF portion of each cycle, the second accumulator 926 receives a signal level $S_2$, indicated by the reference number 1824. The distance d traveled by the light in going from the projector perspective center 1615 to the camera perspective center 1638 is, to within a constant value, equal to $d=½\, c\, t_{on}\, S_2/(S_1+S_2)$.

Figure 19:
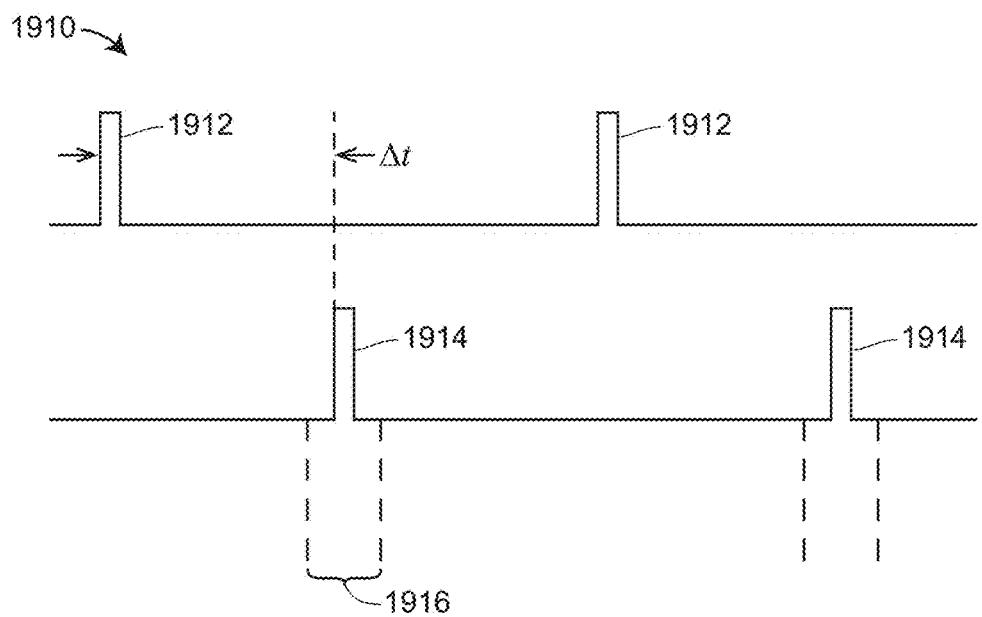
FIG. 19 is a graph illustrating processing of a waveform having pulsed modulation according to an embodiment of the present invention.
Figure 20:
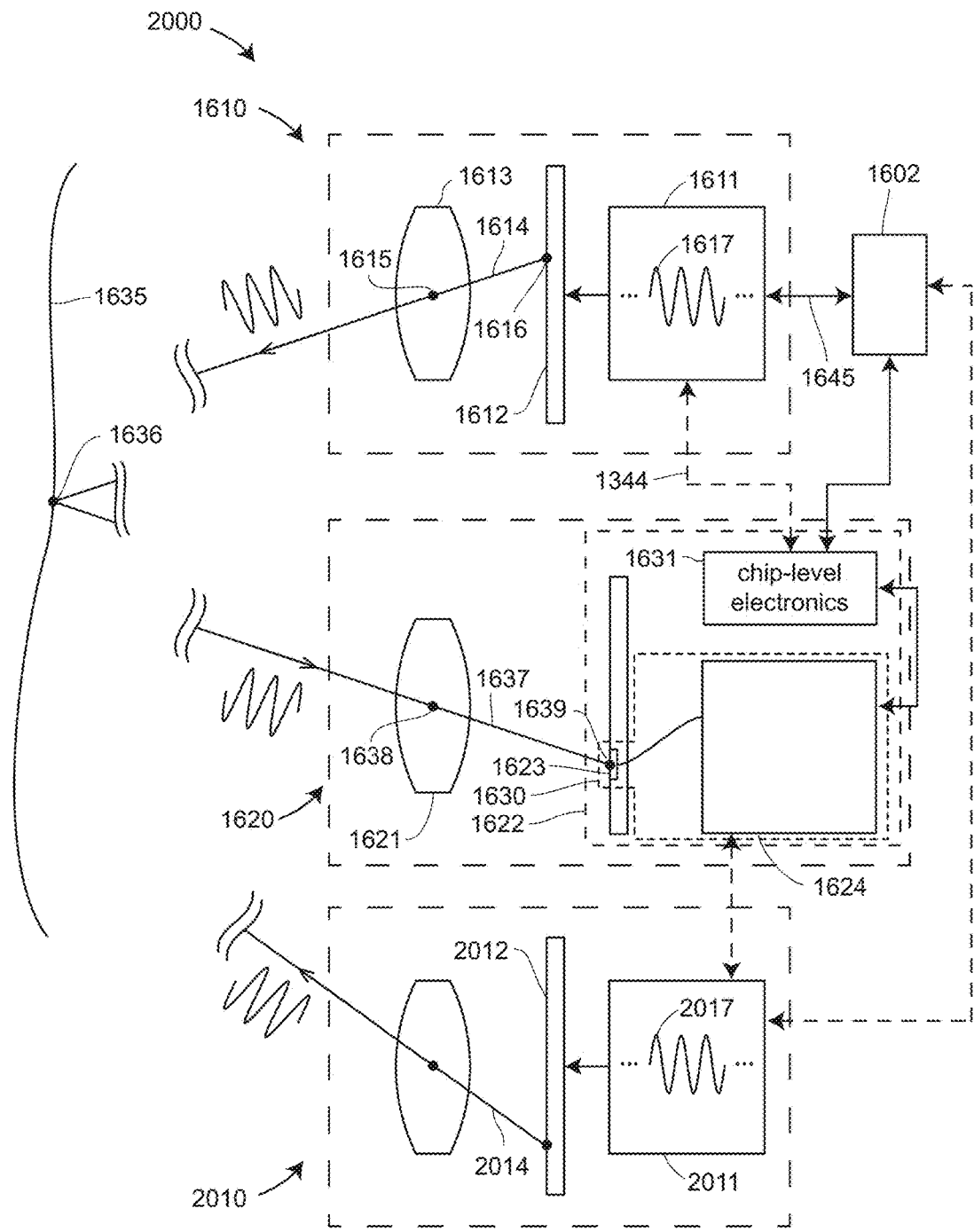
FIG. 20 is a block diagram showing a triangulation scanner having two projectors and further including TOF distance-measuring capability according to an embodiment of the present invention.
Figure 21:
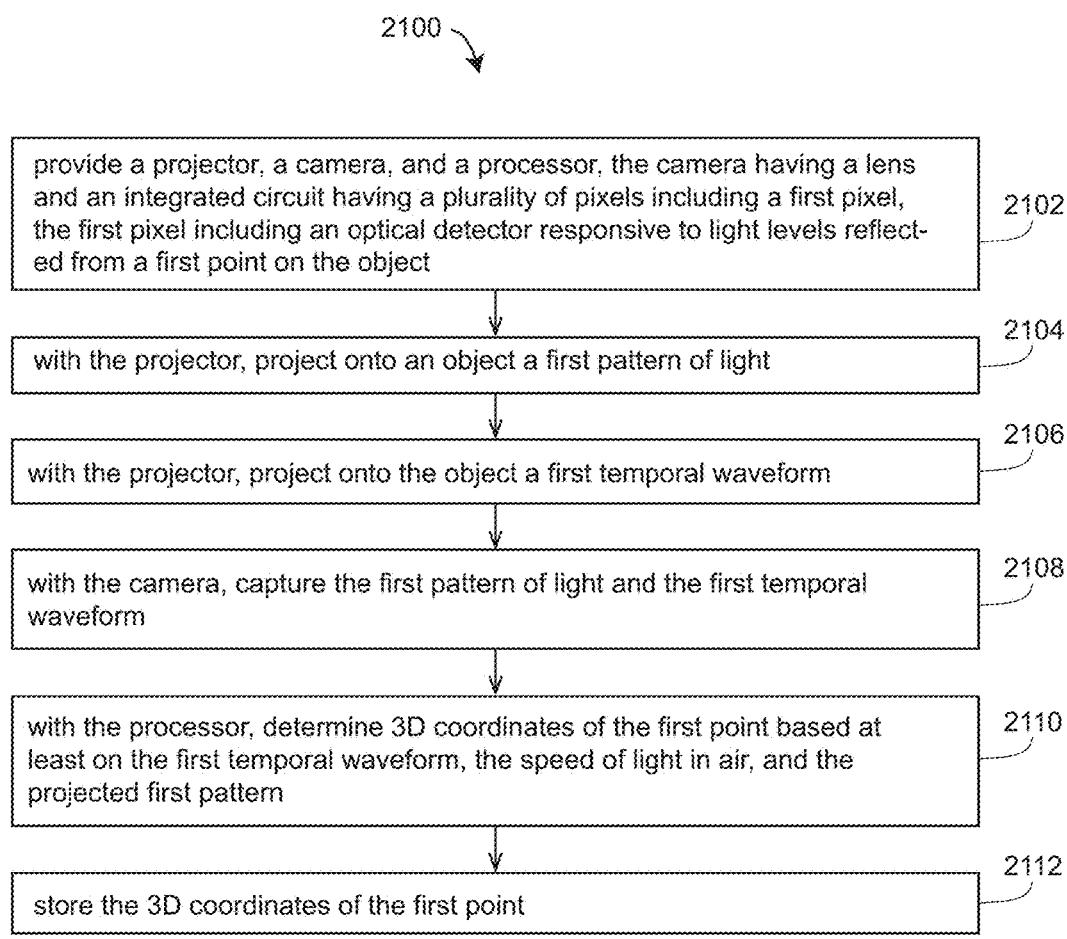
FIG. 21 is a flow chart showing elements of a method for determining 3D coordinates of a point on an object according to an embodiment of the present invention.

FIG. 19 shows an example of pulsed modulation 1910, which is generated by the projector 1610 in FIG. 16. In an embodiment, the circuitry 1624 provides a way to measure the time-of-flight Δt of the from the outgoing light pulse 1912 to the returning light pulse 1914 in traveling from the projector point 1616 to the object point 1636 to the camera point 1639. For the case of rectangular pulses, the method and formula of FIG. 18 can be used to determine the distance d. In another embodiments, the circuitry 1624 provides a way of directly measuring the elapsed time Δt from the launch of the outgoing pulse to the capture of the returning pulse.

A situation that sometimes arises in measuring the distance to objects that are obscured by more strongly reflecting objects is to use a gate 1916, sometimes referred to as a range gate or a time gate. In an embodiment, the circuitry 1624 is enabled to measure return pulses during the gate interval 1916, thereby preventing masking of the signal 1914 by other stronger return signals. In an embodiment, gated signals are captured separately from background images, and may be superimposed on the background images if desired.

In an embodiment, a scanner further includes a second projector 2010. The projector 2010 may be integrated into the scanner 2000 or may be an external projector acting cooperatively with the projector 1610 and camera 1620 but not rigidly affixed to the projector 1610 and camera 1620. The projector 2010 includes a projector source 2011 that produces a pattern emitted from a surface 2012 or, equivalently, emitted along a line 2014. In an embodiment, in addition to having a spatial pattern over the surface 2012 or equivalently over the projected pattern of rays 2014, the pattern also includes a temporal modulation 2017. In an embodiment, the temporal modulation 2017 is applied alternately with the temporal modulation 1617, thereby enabling the two modulations to be distinguished from one another. In another embodiment, the temporal modulation 2017 is turned off while the temporal modulation 1617 is left on, thereby providing another way to distinguish the origin of the two projected patterns. The use of two projected patterns provides advantages in triangulation redundancy similar to the advantages provided by two cameras as described herein above in reference to FIGS. 4, 5, 6A, 6B, 8A, 8B, 8C.

A type of camera used in many applications is a multispectral camera that multiple colors in a scene. In one type of multispectral camera, multiple colors at captured simultaneously within an image, with each color captured by a sensor being responsive to that color. A disadvantage with this type of multispectral camera is that resolution is sacrificed in the captured image. In another type of multispectral camera, multiple colors are captured at different time, either by projecting different colors onto the object under investigation or by providing color filters at each different time. A disadvantage with this approach is that the different colors are not captured at the same time, which can be a problem in dynamic environments.

Figure 22A:
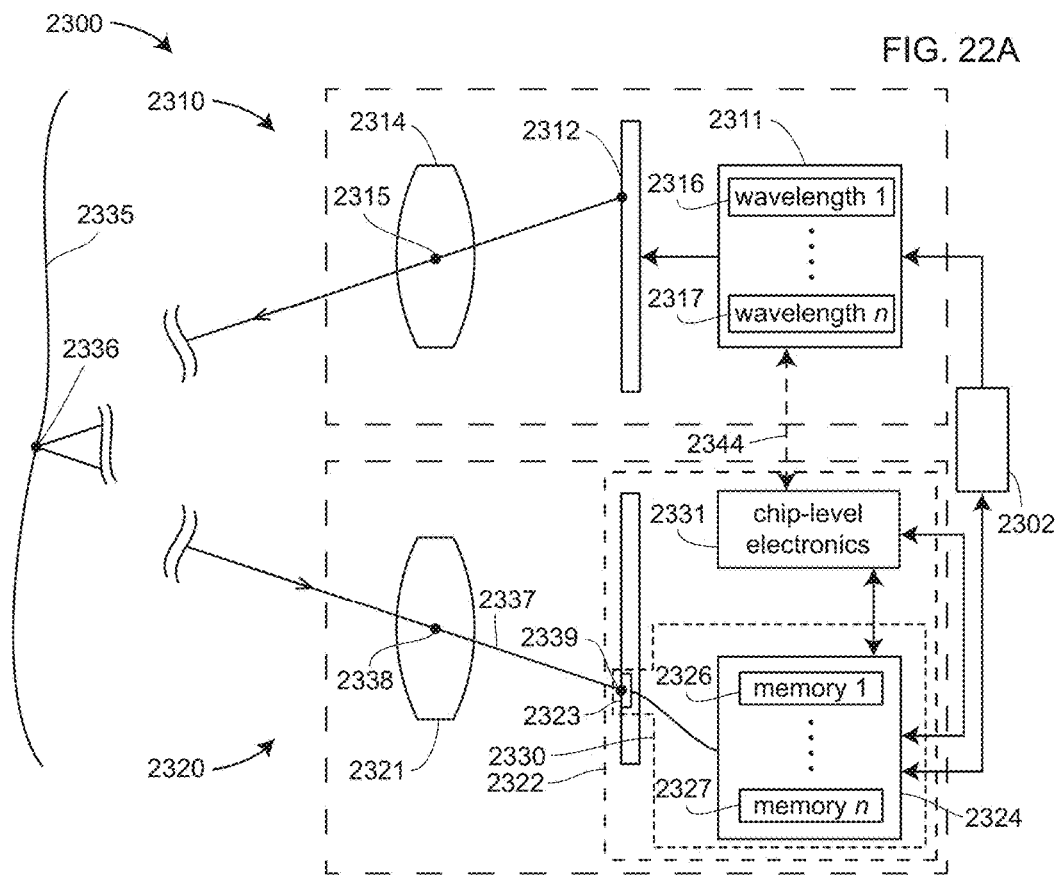
FIG. 22A is a schematic representation of a synchronous multispectral imaging system that uses multiple camera memories and multiple projected colors according to an embodiment of the present invention.

A way around these limitations is illustrated in FIG. 22A. A multispectral system 2300 includes a projector 2310 and a camera 2320. The projector 2310 includes a projector source 2311 that, in an embodiment, emits light from a surface 2312. In another embodiment, the emitted light further includes a pattern, as described herein above, for use in a triangulation scanner or similar device. In an embodiment, the projector source 2311 projects light having a plurality of wavelengths 2316 to 2317, each one of the wavelengths projected in a sequence from a wavelength 1 to a wavelength n. In an embodiment, the projector source 2311 the light through a projector lens 2313, with each ray of light 2314 passing through a perspective center 2315 of the projector lens. The ray of light 2314 is projected to a point 2336 on the object surface 2335. The camera 2320 includes a camera lens 2321 and a camera integrated circuit 2322. In an embodiment, a ray 2337 travels from the object point 2336 through the camera perspective center 2338 to strike the camera integrated circuit 2322 at a point 2339. The camera integrated circuit 2322 includes a camera photosensitive array of pixels 2330 and chip-level electronics 2331. Each pixel 2330 includes an optical detector 2323 and an electrical support element 2324 that includes a plurality of memory elements, including a first memory element 2326 through an $n^{th}$ memory element 2327. The term memory element here means an information storage element within a pixel that retains information about a light level received by the pixel in an interval of time. In an embodiment, the memory elements 2326, 2327 include analog electrical components such as a plurality of capacitors and a switching unit illustrated in FIG. 9D. In an embodiment, each plurality of pixels within the electrical support element 2324 is connected to the chip-level electronics 2331, which communicates with a processor 2302 located off the integrated circuit 2322. In an embodiment, the chip-level electronics 2331 further communicates over a line 2344 with the projector light source 2311. In an embodiment, the electrical support element 2324 further includes a function to reset the memory elements in the electrical support unit 2324. In another embodiment, the memory elements 2324 include digital electrical components to convert the analog signal captured by the optical detector into a digital signal. Examples of digital electrical components that may be used include comparators, counters, and analog-to-digital converters (ADCs). Conversion from analog to digital may also be carried out at the column level or the chip level.

Figure 22B:
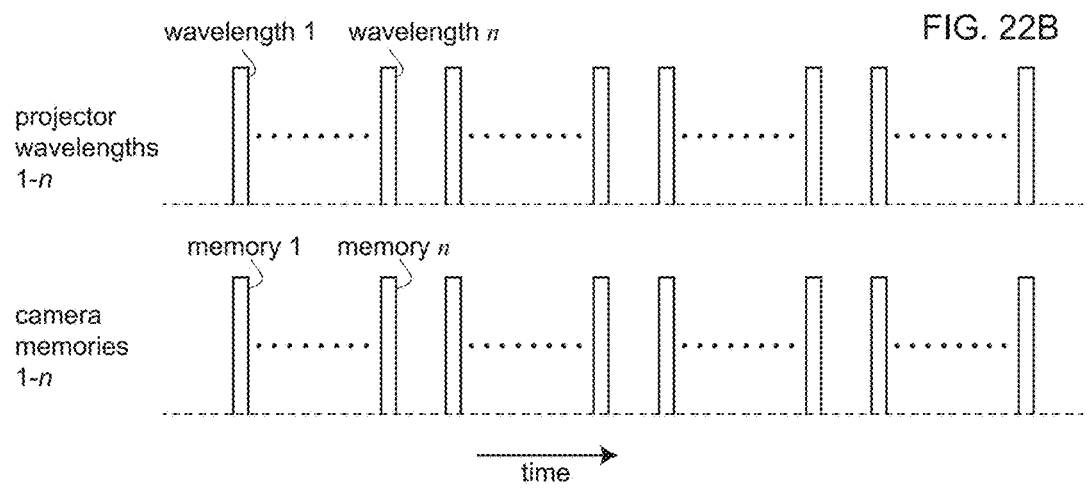
FIG. 22B shows timing of signals for projection of colored lights and storage of those reflected lights in multiple memories according to an embodiment of the present invention.

The projector 2310 sequentially projects the wavelengths 1 through n through the lens 2321 to the object point 2336. The different wavelengths 1 through n are captured by corresponding memories 1 through n, thereby synchronizing the wavelengths with the different pixel memories 1 through n as illustrated in FIG. 22B. An alternative to the apparatus and method described with respect to FIG. 22A would be to store detected light levels in external memory following measurement by the photosensitive array for the different wavelengths. However, such a method uses a relatively long time for electrical pixel values to be transferred into an external memory. In most cases, such transfer occurs relatively slowly over a serial bus. An advantage of the apparatus 2300 and corresponding method described herein above is in being able to move through a large number of wavelengths very quickly since the measured values are saved internally for each pixel, thereby eliminated the need for serial transfer out of the photosensitive array. In this way, potential problems with synchronization as described above are minimized, while also preserving image resolution.

A multispectral system 2300 illustrated in FIG. 22A may be integrated into any of the triangulation systems described herein above, for example, as a part of triangulation scanners shown in FIGS. 3, 4, 5, 6A, 6B, 8A, 8B, 8C.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A triangulation scanner system comprising:
   a projector operable to project onto an object a first pattern of light at a first light level during first time intervals and to project onto the object the first pattern of light at a second light level during second time intervals, the second light level being different than the first light level;
   a first camera including a first lens and a first integrated circuit having a first photosensitive array, the first photosensitive array having a plurality of pixels including a first pixel, the first pixel including an optical detector, a first memory, and a second memory, the optical detector operable to produce signals in response to light levels reflected from a first point on the object, the first memory operable to store signals received from the optical detector during the first time intervals to obtain a first stored signal, the second memory operable to store signals received from the optical detector during the second time intervals to obtain a second stored signal; and
   a processor operable to execute computer instructions that, when executed on the processor, determine three-dimensional (3D) coordinates of the first point based at least in part on the projected first pattern of light, the first stored signal, and the second stored signal.

2. The triangulation scanner system of claim 1 wherein the processor is further operable to execute computer instructions that, when executed on the processor, determine the 3D coordinates of the first point further based on a relative pose of the projector and the first camera.

3. The triangulation scanner system of claim 1 wherein the first time interval has a corresponding second time interval of equal duration.

4. The triangulation scanner system of claim 1 further comprising an analog-to-digital converter operable to convert analog signals to digital signals, the analog-to-digital converter being at a location selected from the group consisting of: within the first pixel, outside the first pixel but within the first integrated circuit, and outside the first integrated circuit.

5. The triangulation scanner system of claim 1 further comprising:
   a second camera including a second lens and a second integrated circuit having a second photosensitive array, the second camera operable to capture a second image of the object on the second photosensitive array.

6. The triangulation scanner of claim 5 wherein the processor is further operable to execute computer instructions that, when executed on the processor, determine the 3D coordinates of the first point further based on a relative pose of the first camera and the second camera.

7. A method comprising:
   providing a projector, a first camera, and a processor, the first camera including a first lens and a first integrated circuit having a first photosensitive array, the first photosensitive array having a plurality of pixels including a first pixel, the first pixel including an optical detector, a first memory, and a second memory;
   with the projector, projecting onto an object a first pattern of light at a first light level during a first time interval;
   with the projector, projecting onto the object the first pattern of light at a second light level during a second time interval, the second light level being different than the first light level;
   with the optical detector, producing signals in response to light levels reflected from a first point on the object;
   with the first memory, storing a signal received from the optical detector during the first time interval to obtain a first stored signal;
   with the second memory, storing a signal received from the optical detector during the second time interval to obtain a second stored signal;
   with the processor, executing computer instructions to determine three-dimensional (3D) coordinates of the first point based at least in part on the projected first pattern of light, the first stored signal, and the second stored signal; and
   storing the 3D coordinates of the first point.

8. The method of claim 7 further comprising:
   with the processor, executing computer instructions to determine the 3D coordinates of the first point further based on a relative pose of the projector and the first camera.

9. The method of claim 7 wherein the first time interval has a corresponding second time interval of equal duration.

10. The method of claim 7 further comprising:
providing an analog-to-digital converter, the analog-to-digital converter being at a location selected from the group consisting of: within the first pixel, outside the first pixel but within the first integrated circuit, and outside the first integrated circuit; and
with the analog-to-digital converter, converting analog signals to digital signals.

11. The method of claim 7 triangulation scanner system of claim 1 further comprising:
providing a second camera including a second lens and a second integrated circuit having a second photosensitive array; and
with the second camera, capturing a second image of the object on the second photosensitive array.

12. The method of claim 11 further comprising:
with the processor, executing computer instructions to determine the 3D coordinates of the first point further based on a relative pose of the first camera and the second camera.

13. A triangulation scanner system comprising:
a projector operable to project onto an object a first pattern of light;
a first camera including a first lens and a first integrated circuit having a first photosensitive array, the first photosensitive array having a plurality of pixels including a first pixel, the first pixel including an optical detector, a first memory, and a second memory, the optical detector operable to produce signals in response to light levels reflected from a first point on the object, the first memory operable to store a signal received from the optical detector during a first time interval to obtain a first stored signal, the second memory operable to store a signal received from the optical detector during a second time interval to obtain a second stored signal, the second time interval being different than the first time interval; and
a processor operable to execute computer instructions that, when executed on the processor, determine three-dimensional (3D) coordinates of the first point based at least in part on the projected first pattern of light, the first stored signal, and the second stored signal.

14. The triangulation scanner system of claim 13 wherein the processor is further operable to execute computer instructions that, when executed on the processor, determine the 3D coordinates of the first point further based on a relative pose of the projector and the first camera.

15. The triangulation scanner system of claim 13 wherein the first time interval has a corresponding second time interval of equal duration.

16. The triangulation scanner system of claim 13 further comprising an analog-to-digital converter operable to convert analog signals to digital signals, the analog-to-digital converter being at a location selected from the group consisting of: within the first pixel, outside the first pixel but within the first integrated circuit, and outside the first integrated circuit.

17. A method comprising:
providing a projector, a first camera, and a processor, the first camera including a first lens and a first integrated circuit having a first photosensitive array, the first photosensitive array having a plurality of pixels including a first pixel, the first pixel including an optical detector, a first memory, and a second memory;
with the projector, projecting onto an object a first pattern of light;
with the optical detector, producing signals in response to light levels reflected from a first point on the object;
with the first memory, storing a signal received from the optical detector during the first time interval to obtain a first stored signal;
with the second memory, storing a signal received from the optical detector during the second time interval to obtain a second stored signal, the second time interval being different than the first time interval;
with the processor, executing computer instructions to determine three-dimensional (3D) coordinates of the first point based at least in part on the projected first pattern of light and on the first stored signal and the second stored signal; and
storing the 3D coordinates of the first point.

18. The method of claim 17 further comprising:
with the processor, executing computer instructions to determine the 3D coordinates of the first point further based on a relative pose of the projector and the first camera.

19. The method of claim 17 further comprising:
providing a second camera including a second lens and a second integrated circuit having a second photosensitive array; and
with the second camera, capturing a second image of the object on the second photosensitive array.

20. The method of claim 19 further comprising:
with the processor, executing computer instructions to determine the 3D coordinates of the first point further based on a relative pose of the first camera and the second camera.

* * * * *